US011438286B2

(12) United States Patent
Massand

(10) Patent No.: US 11,438,286 B2
(45) Date of Patent: Sep. 6, 2022

(54) SYSTEMS AND METHODS FOR EMAIL ATTACHMENTS MANAGEMENT INCLUDING CHANGING ATTRIBUTES

(71) Applicant: Litera Corporation, McLeansville, NC (US)

(72) Inventor: Deepak Massand, McLeansville, NC (US)

(73) Assignee: Litera Corporation, Chicago, IL (US)

( * ) Notice: Subject to any disclaimer, the term of this patent is extended or adjusted under 35 U.S.C. 154(b) by 756 days.

(21) Appl. No.: 15/693,530

(22) Filed: Sep. 1, 2017

(65) Prior Publication Data

US 2018/0013703 A1 Jan. 11, 2018

Related U.S. Application Data

(63) Continuation of application No. 14/221,448, filed on Mar. 21, 2014, now Pat. No. 9,756,002.

(51) Int. Cl.
*H04L 51/08* (2022.01)
*G06F 3/0484* (2022.01)
*G06F 3/0481* (2022.01)
*H04L 51/066* (2022.01)

(52) U.S. Cl.
CPC ............ *H04L 51/08* (2013.01); *G06F 3/0481* (2013.01); *G06F 3/0484* (2013.01); *H04L 51/066* (2013.01)

(58) Field of Classification Search
CPC ..... G06F 3/0481; G06F 3/0484; H04L 51/08; H04L 51/066
USPC .................................................. 715/751, 752
See application file for complete search history.

(56) References Cited

U.S. PATENT DOCUMENTS

| 3,920,895 A | 11/1975 | Vieri et al. |
| 3,920,896 A | 11/1975 | Bishop et al. |
| 5,008,853 A | 4/1991 | Bly et al. |
| 5,129,082 A | 7/1992 | Tirfing et al. |
| 5,146,552 A | 9/1992 | Cassoria et al. |
| 5,204,947 A | 4/1993 | Bernstein et al. |
| 5,321,505 A | 6/1994 | Leddy |
| 5,341,469 A | 8/1994 | Rossberg et al. |
| 5,515,491 A | 5/1996 | Bates et al. |

(Continued)

OTHER PUBLICATIONS

"Bind;" Microsoft Computer Dictionary; May 1, 2002; Microsoft Press; 5th edition; p. 59.*

(Continued)

*Primary Examiner* — Andrew R Dyer
(74) *Attorney, Agent, or Firm* — Nixon Peabody LLP

(57) ABSTRACT

Systems and methods consistent with various disclosed embodiments provide for managing email attachments. In one embodiment, a system is disclosed for managing email attachments. The system may include a memory storing software instructions and one or ore processors configured to execute the software instructions to perform one or more operations. The operations may include providing an interface for converting an original attachment to an email. The operations may also include converting the original attachment to a modified attachment based on input received through the interface. The operations may further include substituting the original attachment to the email with the modified attachment, and providing information to send the email with the modified attachment.

19 Claims, 10 Drawing Sheets

(56) References Cited

U.S. PATENT DOCUMENTS

| | | |
|---|---|---|
| 5,539,871 A | 7/1996 | Gibson |
| 5,596,700 A | 1/1997 | Darnell et al. |
| 5,596,705 A | 1/1997 | Reimer et al. |
| 5,659,676 A | 8/1997 | Redpath |
| 5,664,208 A | 9/1997 | Pavley et al. |
| 5,669,005 A | 9/1997 | Curbow et al. |
| 5,671,428 A | 9/1997 | Muranaga et al. |
| 5,694,544 A | 12/1997 | Tanigawa et al. |
| 5,706,452 A | 1/1998 | Ivanov |
| 5,706,502 A | 1/1998 | Foley et al. |
| 5,708,826 A | 1/1998 | Ikeda et al. |
| 5,708,845 A | 1/1998 | Wistendahl et al. |
| 5,740,444 A | 4/1998 | Frid-Nielsen |
| 5,752,055 A | 5/1998 | Redpath et al. |
| 5,758,313 A | 5/1998 | Shah et al. |
| 5,761,419 A | 6/1998 | Schwartz et al. |
| 5,761,499 A | 6/1998 | Sonderegger |
| 5,781,732 A | 7/1998 | Adams |
| 5,781,901 A | 7/1998 | Kuzma |
| 5,787,175 A | 7/1998 | Carter |
| 5,799,191 A | 8/1998 | Moriyasu et al. |
| 5,801,702 A | 9/1998 | Dolan et al. |
| 5,809,512 A | 9/1998 | Kato |
| 5,860,073 A | 1/1999 | Ferrel et al. |
| 5,864,870 A | 1/1999 | Guck |
| 5,870,754 A | 2/1999 | Dimitrova et al. |
| 5,878,421 A | 3/1999 | Ferrel et al. |
| 5,890,177 A | 3/1999 | Moody et al. |
| 5,893,126 A | 4/1999 | Drews et al. |
| 5,911,776 A | 6/1999 | Guck |
| 5,931,906 A | 8/1999 | Fidelibus, Jr. et al. |
| 5,937,066 A | 8/1999 | Gennaro et al. |
| 5,938,724 A | 8/1999 | Pommier et al. |
| 5,944,785 A | 8/1999 | Pommier et al. |
| 5,949,413 A | 9/1999 | Lerissa et al. |
| 5,950,214 A | 9/1999 | Rivette et al. |
| 5,956,736 A | 9/1999 | Hanson et al. |
| 5,958,006 A | 9/1999 | Eggleston et al. |
| 5,978,836 A | 11/1999 | Ouchi |
| 5,987,469 A | 11/1999 | Lewis et al. |
| 6,009,462 A | 12/1999 | Birrell et al. |
| 6,014,135 A | 1/2000 | Fernandes |
| 6,029,171 A | 2/2000 | Smiga et al. |
| 6,064,751 A | 5/2000 | Smithies et al. |
| 6,067,551 A | 5/2000 | Brown et al. |
| 6,073,142 A | 6/2000 | Geiger et al. |
| 6,088,709 A | 7/2000 | Watanabe |
| 6,119,147 A | 9/2000 | Toomey et al. |
| 6,158,903 A | 12/2000 | Schaeffer et al. |
| 6,178,431 B1 | 1/2001 | Douglas |
| 6,182,080 B1 | 1/2001 | Clements |
| 6,212,534 B1 | 4/2001 | Lo et al. |
| 6,243,722 B1 | 6/2001 | Day et al. |
| 6,289,460 B1 | 9/2001 | Hajmiragha |
| 6,317,777 B1 | 11/2001 | Skarbo et al. |
| 6,334,141 B1 | 12/2001 | Varma et al. |
| 6,336,134 B1 | 1/2002 | Varma |
| 6,343,313 B1 | 1/2002 | Salesky et al. |
| 6,360,236 B1 | 3/2002 | Khan et al. |
| 6,363,352 B1 | 3/2002 | Dailey et al. |
| 6,411,989 B1 | 6/2002 | Anupam et al. |
| 6,560,637 B1 | 5/2003 | Dunlap et al. |
| 6,590,584 B1 | 7/2003 | Yamaura et al. |
| 6,643,663 B1 | 11/2003 | Dabney et al. |
| 6,681,371 B1 | 1/2004 | Devanbu |
| 6,687,878 B1 | 2/2004 | Eintracht et al. |
| 6,708,172 B1 | 3/2004 | Wong et al. |
| 7,103,915 B2 | 9/2006 | Redlich et al. |
| 7,113,948 B2 | 9/2006 | Jhingan et al. |
| 7,117,210 B2 | 10/2006 | DeSalvo |
| 7,212,814 B2 | 5/2007 | Wilson et al. |
| 7,251,680 B2 | 7/2007 | DeVos |
| 7,424,513 B2 | 9/2008 | Winjum et al. |
| 7,424,543 B2 | 9/2008 | Rice, III |
| 7,570,964 B2 | 8/2009 | Maes |
| 7,623,515 B2 | 11/2009 | Breuer et al. |
| 7,640,308 B2 | 12/2009 | Antonoff et al. |
| 7,797,724 B2 † | 9/2010 | Calvin |
| 7,818,660 B2 | 10/2010 | Massand |
| 7,895,166 B2 | 2/2011 | Foygel et al. |
| 7,895,276 B2 | 2/2011 | Massand |
| 8,060,575 B2 | 11/2011 | Massand |
| 8,065,424 B2 | 11/2011 | Foresti et al. |
| 8,136,031 B2 | 3/2012 | Massand |
| 8,601,063 B2 | 12/2013 | Sylthe |
| 8,977,697 B2 | 3/2015 | Massand |
| 9,286,471 B2 | 3/2016 | Qureshi |
| 9,756,002 B2 * | 9/2017 | Massand ............... H04L 51/08 |
| 2001/0037367 A1 | 11/2001 | Iyer |
| 2002/0049786 A1 | 4/2002 | Bibliowicz et al. |
| 2002/0059342 A1 | 5/2002 | Gupta et al. |
| 2002/0059343 A1 | 5/2002 | Kurishima et al. |
| 2002/0065848 A1 | 5/2002 | Walker et al. |
| 2002/0078088 A1 | 6/2002 | Kuruoglu et al. |
| 2002/0085030 A1 | 7/2002 | Ghani |
| 2002/0091741 A1 | 7/2002 | Ferreira et al. |
| 2002/0107886 A1 | 8/2002 | Gentner et al. |
| 2002/0143691 A1 | 10/2002 | Ramaley et al. |
| 2003/0050933 A1 | 3/2003 | DeSalvo |
| 2003/0112273 A1 | 6/2003 | Hadfield et al. |
| 2003/0145017 A1 | 7/2003 | Patton et al. |
| 2003/0158855 A1 | 8/2003 | Farnham et al. |
| 2003/0182323 A1 | 9/2003 | Demsky |
| 2003/0197730 A1 | 10/2003 | Kakuta et al. |
| 2004/0034688 A1 | 2/2004 | Dunn |
| 2004/0085354 A1 | 5/2004 | Massand |
| 2004/0203947 A1 | 10/2004 | Moles |
| 2004/0205653 A1 | 10/2004 | Hadfield et al. |
| 2005/0060375 A1 | 3/2005 | Ernest et al. |
| 2006/0069733 A1 | 3/2006 | Antonoff et al. |
| 2006/0075041 A1 † | 4/2006 | Antonoff |
| 2006/0089931 A1 | 4/2006 | Giacobbe et al. |
| 2006/0167879 A1 | 7/2006 | Umeki et al. |
| 2006/0253482 A1 | 11/2006 | Zellweger et al. |
| 2007/0016613 A1 | 1/2007 | Foresti et al. |
| 2007/0061373 A1 | 3/2007 | Kilday |
| 2007/0067397 A1 | 3/2007 | Tran |
| 2007/0143425 A1 | 6/2007 | Kieselbach et al. |
| 2007/0174766 A1 † | 7/2007 | Rubin |
| 2007/0186157 A1 | 8/2007 | Walker et al. |
| 2008/0162652 A1 | 7/2008 | True et al. |
| 2008/0183824 A1 | 7/2008 | Chen et al. |
| 2008/0215509 A1 | 9/2008 | Charlton |
| 2008/0280633 A1 | 11/2008 | Agiv |
| 2009/0037407 A1 | 2/2009 | Yang |
| 2010/0174678 A1 | 7/2010 | Massand |
| 2011/0125853 A1 | 5/2011 | Weber |
| 2011/0202621 A1 | 8/2011 | Laval |
| 2012/0030772 A1 | 2/2012 | Massand |
| 2013/0086692 A1 * | 4/2013 | Massand ............... G06Q 10/107 726/26 |
| 2013/0254528 A1 | 9/2013 | Brown et al. |
| 2014/0019558 A1 | 1/2014 | Pollack |
| 2014/0208193 A1 | 7/2014 | Parmar |
| 2015/0143548 A1 | 5/2015 | Massand |
| 2018/0054441 A1 * | 2/2018 | Massand ............... G06Q 10/107 |

OTHER PUBLICATIONS

"Remove;" Merriam-Webster; Jan. 22, 2014; m-w.com; pp. 1-3.*
Claim Construction Brief, Litera Press Release, "Litera Announces Release of Medacte Providing Enterprise wide, Server-based Metadata Removal" (Aug. 18, 2011).
"Service Support Offerings Professional & Learning Services"; Clearswift Services (12 pages).
"Think Your Deletions Are Gone Forever? Think Again! ezClean™ Makes Metadata Removal Easy!"; Kraft & Kennedy Lesser; dated Jul. 27, 2004. (1 page).
"Think Your Deletions Are Gone Forever? Think Again! ezClean™ Makes Metadata Removal Easy!"; Kraft & Kennedy Lesser; dated Apr. 5, 2005. (1 page).

(56) References Cited

OTHER PUBLICATIONS

"Think Your Deletions Are Gone Forever? Think Again! ezClean™ Makes Metadata Removal Easy!"; Kraft & Kennedy Lesser; dated Mar. 17, 2005. (1 page).
"User's Guide by KKL Software"; ezClean Version 3.1 (15 pages).
"Installation Guide and Admin Manual by KKL Software"; ezClean Version 3.0.x (14 pages).
"Installation Guide and Admin Manual by KKL Software"; ezClean; Version 3.3 (34 pages).
"Integration Guide for use with CS MailSweeper for SMTP"; ezClean; Version 3.3; KKL Software (15 pages).
"BETA Program Agreement" (4 pages).
"How do I make sure that there is no embarrassing Metadata in any documents that I attach to e-mails?"; KKL Software (2 pages).
"How do I remove metadata from documents that I attach to e-mails?"; KKL Software (1 page).
Beta Program Guide; "MAILsweeper for SMTP 4.3" (5 pages).
Beta Program Qualification Form; "MAILsweeper for SMTP 4.3" (4 pages).
Petition for Inter Partes Review of U.S. Pat. No. 7,895,276 in *DocsCorp LLC v. Litera Technologies LLC*, Case IPR2016-00541 (PTAB Feb. 10, 2016) (Paper 1) (70 pages).
Declaration of Dr. Michael J. Freedman in Support of Petition for Inter Partes Review of U.S. Pat. No. 7,895,276 in *DocsCorp LLC v. Litera Technologies LLC*, Case IPR2016-00541 (PTAB Feb. 10, 2016) (Paper 6) (138 pages).
Petition for Inter Partes Review of U.S. Pat. No. 8,060,575 in *DocsCorp LLC v. Litera Technologies LLC*, Case IPR2016-00542 (PTAB Feb. 10, 2016) (Paper 1) (72 pages).
Declaration of Dr. Michael J. Freedman in Support of Petition for Inter Partes Review of U.S. Pat. No. 8,060,575 in *DocsCorp LLC v. Litera Technologies LLC*, Case IPR2016-00542 (PTAB Feb. 10, 2016) (Paper 6) (146 pages).
Ex. 1003 to Petition in Case IPR2016-00541 and IPR2016-00542, KKL Software webpage on the 2004 ezClean software website by Kraft Kennedy Lessar, Inc. (Paper 7) (2 pages).
Ex. 1004 to Petition in Case IPR2016-00541 and IPR2016-00542, ezClean details webpage on the 2004 ezClean software website by Kraft Kennedy Lessar, Inc. (Paper 8) (4 pages).
Ex. 1005 to Petition in Case IPR2016-00541 and IPR2016-00542, ezClean New Features webpage on the 2004 ezClean software website by Kraft Kennedy Lessar, Inc. (Paper 9) (3 pages).
Ex. 1006 to Petition in Case IPR2016-00541 and IPR2016-00542, ezClean 3.2 New Features webpage on the 2004 ezClean software website by Kraft Kennedy Lessar, Inc. (Paper 10) (3 pages).
Ex. 1007 to Petition in Case IPR2016-00541 and IPR2016-00542, ezClean FAQ webpage on the 2004 ezClean software website by Kraft Kennedy Lessar, Inc. (Paper 11) (3 pages).
Ex. 1008 to Petition in Case IPR2016-00541 and IPR2016-00542, ezClean Version 3.3 Installation Guide and Admin Manual by KKL Software on the 2005 ezClean software website by Kraft Kennedy Lessar, Inc. (Paper 12) (36 pages).
Ex. 1009 to Petition in Case IPR2016-00541 and IPR2016-00542, Declaration of Christopher Butler, Office Manager at the Internet Archive, dated Nov. 17, 2015 (Paper 13) (2 pages).
Ex. 1010 to Petition in Case IPR2016-00541 and IPR2016-00542, Exhibit A to the Declaration of Christopher Butler (Paper 14) (55 pages).
Ex. 1011 to Petition in Case IPR2016-00541 and IPR2016-00542, U.S. Pat. No. 7,640,308 to Antonoff (Paper 15) (12 pages).
Ex. 1012 to Petition in Case IPR2016-00541 and IPR2016-00542, U.S. Pat. No. 7,570,964 to Maes (Paper 16) (12 pages).
Ex. 1013 to Petition in Case IPR2016-00541 and IPR2016-00542, U.S. Pat. No. 8,209,538 to Craigie (Paper 17) (10 pages).
Ex. 1014 to Petition in Case IPR2016-00541 and IPR2016-00542, CS MAILsweeper 4.3 for SMTP by Clearswift Ltd (2002) (Paper 18) (5 pages).
Ex. 1015 to Petition in Case IPR2016-00541 and IPR2016-00542, MIMEsweeper Solutions webpage on the 2002 website (Paper 19) (2 pages).
Ex. 1016 to Petition in Case IPR2016-00541 and IPR2016-00542, Lotus Announces cc Mail for the World Wide Web, Provides Easy Access to EMail via the Web, PR Newswire (Sep. 26, 1995) (Paper 20) (4 pages).
Ex. 1017 to Petition in Case IPR2016-00541 and IPR2016-00542, Simple Mail Transfer Protocol, Internet Engineering Task Force (IETF), RFC 821 (Aug. 1982) (Paper 21) (73 pages).
Ex. 1018 to Petition in Case IPR2016-00541 and IPR2016-00542, MIME (Multipurpose Internet Mail Extensions) Mechanisms for Specifying and Describing the Format of Internet Message Bodies, Internet Engineering Task Force (IETF), RFC 1341 (Jun. 1992) (Paper 22) (71 pages).
Ex. 1019 to Petition in Case IPR2016-00541 and IPR2016-00542, Middleboxes Taxonomy and Issues, Internet Engineering Task Force (IETF), RFC 3234 (Feb. 2002) (Paper 23) (28 pages).
Patent Owner's Preliminary Responses in Case IPR2016-00541 in *DocsCorp LLC v. Litera Technologies LLC*, Case IPR2016-00541 (PTAB May 10, 2016) (59 pages).
Patent Owner's Preliminary Responses in Case IPR2016-00542 in *DocsCorp LLC v. Litera Technologies LLC*, Case IPR2016-00541 (59 pages).
Institution Decision in *DocsCorp LLC v. Litera Techs. LLC*, Case No. IPR2016-00541 (22 pages).
Institution Decision in *DocsCorp LLC v. Litera Techs. LLC*, Case No. IPR2016-00542 (23 pages).
Patent Owner Response in Case No. IPR2016-00541 (81 pages).
Ex. 2077 (Expert Declaration of John Guyer) in Case No. IPR2016-00541 (192 pages).
Patent Owner Response in *DocsCorp LLC v. Litera Techs. LLC*, Case No. IPR2016-00542 (80 pages).
Ex. 2077 (Expert Declaration of John Guyer) in *DocsCorp LLC v. Litera Techs. LLC*, Case No. IPR2016-00542 (191 pages).
Ex. 2021 in Case Nos. IPR2016-00541 and IPR2016-00542, Internet Archive webpage, *Information Requests—The Internet Archive's Policy for Responding to Information Requests*, https://archive.org/legal (last accessed Sep. 26, 2016) (2 pages).
Ex. 2022 in Case Nos. IPR2016-00541 and IPR2016-00542, Internet Archive webpage, *Standard Affidavit*, https://archive.org/legal/affidavit.php (last accessed Sep. 26, 2016) (1 page).
Ex. 2023 in Case Nos. IPR2016-00541 and IPR2016-00542, Internet Archive webpage, *Legal Frequently Asked Questions*, https://archive.org/legal/faq.php (last accessed Sep. 26, 2016) (4 pages).
Ex. 2024 in Case Nos. IPR2016-00541 and IPR2016-00542, Internet Archive webpage, https://web.archive.org/web/20070202072717/http:/kklsoftware.com (last accessed Sep. 29, 2016) (1 page).
Ex. 2025 in Case Nos. IPR2016-00541 and IPR2016-00542, Internet Archive webpage, https://web.archive.org/web/20060414015245/http:/kklsoftware.com (last accessed Sep. 29, 2016) (1 page).
Ex. 2026 in Case Nos. IPR2016-00541 and IPR2016-00542, Internet Archive webpage, https://web.archive.org/web/20050405051007/http:/www.kklsoftware.com (last accessed Sep. 29, 2016) (1 page).
Ex. 2027 in Case Nos. IPR2016-00541 and IPR2016-00542, Cross-examination transcript of Christopher Butler, dated Oct. 6, 2016 (53 pages).
Ex. 2028 in Case Nos. IPR2016-00541 and IPR2016-00542, International Legal Technology Association, ILTA's 2006 Technology Survey, Aug. 2006 (24 pages).
Ex. 2029 in Case Nos. IPR2016-00541 and IPR2016-00542, MIT Sloan Alumni webpage bio, *Michael J. Freedman, SB 2001, MNG 2002*, http://mitsloan.mit.edu/alumni/events/iot-series-bios-freedman/ (last accessed Oct. 17, 2016) (2 pages).
Ex. 2030 in Case Nos. IPR2016-00541 and IPR2016-00542, M. Freedman, et al., *SANE: A Protection Architecture for Enterprise Networks* (Aug. 2006) (15 pages).
Ex. 2031 in Case Nos. IPR2016-00541 and IPR2016-00542, M. Freedman, et al., *Shark: Scaling File Servers via Cooperative Caching* (May 2005) (14 pages).
Ex. 2032 in Case Nos. IPR2016-00541 and IPR2016-00542, M. Freedman, et al., *Economic Barriers to the Deployment of Existing Privacy Technologies* (May 2002) (3 pages).
Ex. 2033 in Case Nos. IPR2016-00541 and IPR2016-00542, DocsCorp White Paper, *Metadata Management in 2015 Requires a Rethink* . . . (8 pages).

(56) References Cited

OTHER PUBLICATIONS

Ex. 2034 in Case Nos. IPR2016-00541 and IPR2016-00542, DocsCorp, cleanDocs Datasheet (available at http://www.docscorp.com/Documents/Product%20datasheets/cleanDocs_datasheet.pdf) (2 pages).
Ex. 2035 in Case Nos. IPR2016-00541 and IPR2016-00542, Declaration of Michael J. Freedman in CBM2013-00025 (20 pages).
Ex. 2036 in Case Nos. IPR2016-00541 and IPR2016-00542, U.S. Appl. No. 11/699,750 (20 pages).
Ex. 2037 in Case Nos. IPR2016-00541 and IPR2016-00542, Webster's New World Computer Dictionary (10th ed. 2003) (excerpts) (6 pages).
Ex. 2038 in Case Nos. IPR2016-00541 and IPR2016-00542, U.S. Department of Labor, Occupational Outlook Handbook 2006-2007 (2006) (excerpts) (6 pages).
Ex. 2039 in Case Nos. IPR2016-00541 and IPR2016-00542, B. Burney, *Software Shootout: Disappearing Data, Metadata Assistant and Workshare Metawall Can Make Metadata a Thing of the Past*, 30 Law Office Computing 41-43 (2003) (5 pages).
Ex. 2040 in Case Nos. IPR2016-00541 and IPR2016-00542, Microsoft Computer Dictionary (5th ed. 2002) (excerpts) (7 pages).
Ex. 2041 in Case Nos. IPR2016-00541 and IPR2016-00542, M. Haider and Networks First, Market Insight Paper, *The Impact of Network Downtime on Businesses Today* (Jul. 2007) (19 pages).
Ex. 2042 in Case Nos. IPR2016-00541 and IPR2016-00542, W. Schmied & K. Miller, MCTS Microsoft® Exchange Server 2007 Configuration Study Guide (2007) (excerpts) (5 pages).
Ex. 2043 in Case Nos. IPR2016-00541 and IPR2016-00542, Microsoft® Exchange Server 2007: Tony Redmond's Guide (2007) (excerpts) (5 pages).
Ex. 2044 in Case Nos. IPR2016-00541 and IPR2016-00542, ZDNet, *Lack of email 'more traumatic than divorce'*, http://www.zdnet.com/article/lack-of-email-more-traumatic-than-divorce/ (Jun. 5, 2003) (last accessed Oct. 30, 2016) (4 pages).
Ex. 2045 in Case Nos. IPR2016-00541 and IPR2016-00542, BBC News, *Loss of e-mail 'worse than divorce'*, http://news.bbc.co.uk/2/hi/technology/3104889.stm (Jul. 29, 2003) (last accessed Oct. 17, 2016) (2 pages).
Ex. 2046 in Case Nos. IPR2016-00541 and IPR2016-00542, C. Luce, *What's the Matter with Metadata?*, The Colorado Lawyer, Official Publication of the Colorado Bar Association (Nov. 2007) (10 pages).
Ex. 2047 in Case Nos. IPR2016-00541 and IPR2016-00542, M. Betts, Computerworld, *The No. 1 Cause of IT Failure: Complexity*, http://www.computerworld.com/article/2550521/enterprise-applications/the-no--1-cause-of-it-failure--complexity.html (Dec. 21, 2009) (last accessed Sep. 29, 2016) (3 pages).
Ex. 2048 in Case Nos. IPR2016-00541 and IPR2016-00542, J. Wortham, *Customers Angered as iPhones Overload AT&T*, New York Times (Sep. 2, 2009), available at http://www.nytimes.com/2009/09/03/technology/companies/03att.html (last accessed Sep. 26, 2016) (2 pages).
Ex. 2049 in Case Nos. IPR2016-00541 and IPR2016-00542, D. Chaffey, *Email client popularity*, Smart Insights Marketing Intelligence Ltd. (Jan. 12, 2011), available at http://www.smartinsights.com/email-marketing/email-marketing-analytics/most-popular-email-marketing-clients/attachment/email-client-popularity/ (last accessed Sep. 30, 2016) (1 page).
Ex. 2050 in Case Nos. IPR2016-00541 and IPR2016-00542, D. Chaffey, *The most popular email marketing clients?*, Smart Insights Marketing Intelligence Ltd. (Jan. 23, 2014), available at http://www.smartinsights.com/email-marketing/email-marketing-analytics/most-popular-email-marketing-clients/(last accessed Sep. 30, 2016) (7 pages).
Ex. 2051 in Case Nos. IPR2016-00541 and IPR2016-00542, BlackBerry, User Guide: BlackBerry 8100 Smartphone (2008) (283 pages).
Ex. 2052 in Case Nos. IPR2016-00541 and IPR2016-00542, Apple Press Release, *iPhone Premieres This Friday Night at Apple Retail Stores* (Jun. 28, 2007), available at http://www.apple.com/pr/library/2007/06/28/iPhone-Premieres-This-Friday-Night-at-Apple-Retail-Stores.html (last accessed Sep. 27, 2016) (3 pages).

Ex. 2053 in Case Nos. IPR2016-00541 and IPR2016-00542, T-Mobile Press Release, T-Mobile Unveils the T-Mobile G1—the First Phone Powered by Android (Sep. 23, 2008), available at https://newsroom.t-mobile.com/news-and-blogs/t-mobile-unveils-the-t-mobile-g1-the-first-phone-powered-by-android.htm (last accessed Sep. 27, 2016) (3 pages).
Ex. 2054 in Case Nos. IPR2016-00541 and IPR2016-00542, K. German, CNET, *A Brief History of Android Phones* (Aug. 2, 2011), available at https://www.cnet.com/news/a-brief-history-of-android-phones/ (last accessed Oct. 30, 2016) (12 pages).
Ex. 2055 in Case Nos. IPR2016-00541 and IPR2016-00542, Open Handset Alliance Press Release, *Industry Leaders Announce Open Platform for Mobile Devices* (Nov. 5, 2007), available at http://www.openhandsetalliance.com/press_110507.html (last accessed Oct. 30, 2016) (6 pages).
Ex. 2056 in Case Nos. IPR2016-00541 and IPR2016-00542, S. Kerner, InternetNews.com, *Report: Symbian at a Mobile Loss* (Feb. 10, 2006), available at http://www.internetnews.com/wireless/print.php/3584431 (last accessed Sep. 15, 2016) (1 page).
Ex. 2057 in Case Nos. IPR2016-00541 and IPR2016-00542, BlackBerry User Guide, BlackBerry 7100 and 7130, Version 4.1 (2006) (162 pages).
Ex. 2058 in Case Nos. IPR2016-00541 and IPR2016-00542, S. Segan, PC Magazine Product Review, *RIM BlackBerry 7130c* (Jul. 5, 2006), available at http://www.pcmag.com/article2/0,2817,1984923,00.asp (last accessed Oct. 5, 2016) (4 pages).
Ex. 2059 in Case Nos. IPR2016-00541 and IPR2016-00542, BlackBerry Press Release for BlackBerry® Pearl™ 8100™ (Sep. 2006), available at http://www.blackberry.com/newsletters/connection/small_business/Sept2006/Sept2006-smbiz-blackberry-pearl.shtml?cp=NLC-30 (last accessed Oct. 5, 2016) (2 pages).
Ex. 2060 in Case Nos. IPR2016-00541 and IPR2016-00542, Verizon News Release for BlackBerry Pearl 8130, *Verizon Wireless Launches the First CDMA-Enabled BlackBerry Pearl* (Oct. 31, 2007), available at http://www.verizonwireless.com/news/article/2007/11/pr2007-11-01b.html (last accessed Oct. 5, 2016) (2 pages).
Ex. 2061 in Case Nos. IPR2016-00541 and IPR2016-00542, BlackBerry, User Guide: BlackBerry Pearl 8130 Smartphone (2007) (270 pages).
Ex. 2062 in Case Nos. IPR2016-00541 and IPR2016-00542, C. Albanesius, PC Magazine, *Did AT&T Quietly Improve EDGE Data Rates for iPhone* (Jun. 29, 2007), available at http://www.pcmag.com/article2/0,2817,2152744,00.asp (last accessed Oct. 5, 2016) (2 pages).
Ex. 2063 in Case Nos. IPR2016-00541 and IPR2016-00542, K. Komando, USA Today, *Get Online with Laptop Cellular Card* (Feb. 15, 2007), available at http://usatoday30.usatoday.com/tech/columnist/kimkomando/2007-02-15-laptop-cellular-card_x.htm (last accessed Oct. 5, 2016) (2 pages).
Ex. 2064 in Case Nos. IPR2016-00541 and IPR2016-00542, U.S. Pat. No. 8,745,084, assigned to DocsCorp Australia, Sydney (AU) (15 pages).
Ex. 2065 in Case Nos. IPR2016-00541 and IPR2016-00542, Microsoft TechNet, *How Terminal Services Works* (Mar. 28, 2003), available at https://technet.microsoft.com/en-us/library/cc755399(v=ws.10).aspx (last accessed Oct. 5, 2015) (14 pages).
Ex. 2066 in Case Nos. IPR2016-00541 and IPR2016-00542, Microsoft TechNet, *Remote Desktop Services Overview* (May 7, 2014), available at https://technet.microsoft.com/library/hh831447.aspx (last accessed Oct. 5, 2015) (5 pages).
Ex. 2067 in Case Nos. IPR2016-00541 and IPR2016-00542, RFC 2821, Simple Mail Transfer Protocol (Apr. 2001) (74 pages).
Ex. 2068 in Case Nos. IPR2016-00541 and IPR2016-00542, Screenshots from Microsoft Outlook 2016, prepared by John Guyer (3 pages).
Ex. 2069 in Case Nos. IPR2016-00541 and IPR2016-00542, Software Security Solutions, White Paper, *Choosing Anti-Virus Software, A Guide to Selecting the Right Solution for Your Business* (2007) (16 pages).
Ex. 2070 in Case Nos. IPR2016-00541 and IPR2016-00542, Microsoft TechNet, *Managing Global Address Lists* (Jan. 31, 2007), available at https://technet.microsoft.com/en-us/library/bb232101(v=exchg.80).aspx (last accessed Oct. 30, 2016) (2 pages).
Ex. 2071 in Case Nos. IPR2016-00541 and IPR2016-00542, Statista, *Global Smartphone Shipments by BlackBerry (RIM) from 2007 to*

(56) References Cited

OTHER PUBLICATIONS

*2013*, available at https://www.statista.com/statistics/263395/rim-smartphones-shipped-worldwide-since-1st-quarter-2007/ (last accessed Oct. 28, 2016) (3 pages).

Ex. 2072 in Case Nos. IPR2016-00541 and IPR2016-00542, BlackBerry Limited, SEC Form 40-F (Mar. 27, 2015) (excerpts) (15 pages).

Ex. 2073 in Case Nos. IPR2016-00541 and IPR2016-00542, Statista, *Global Annual Shipments of Smartphones Using the Android Operating System from 2007 to 2016*, available at https://www.statista.com/statistics/241947/global-shipment-forecast-of-smartphones-using-android-os/ (last accessed Oct. 28, 2016) (3 pages).

Ex. 2074 in Case Nos. IPR2016-00541 and IPR2016-00542, Statista, *Unit Sales of the Apple iPhone Worldwide from 2007 to 2015*, available at https://www.statista.com/statistics/276306/global-apple-iphone-sales-since-fiscal-year-2007/ (last accessed Oct. 28, 2016) (3 pages).

Ex. 2075 in Case Nos. IPR2016-00541 and IPR2016-00542, Mobile Broadband Reviews, *2010 Wireless Broadband Reviews*, available at http://www.mobile-broadband-reviews.com/wireless-broadband-reviews.html (last accessed Oct. 28, 2016) (19 pages).

Ex. 2076 in Case Nos. IPR2016-00541 and IPR2016-00542, D. Andersen, Root Metrics, *Mobile Network Performance in the United States* (Aug. 18, 2015) (47 pages).

Ex. 2078 in Case Nos. IPR2016-00541 and IPR2016-00542, Cross-examination transcript of Michael J. Freedman, dated Oct. 21, 2016 (147 pages).

Ex. 2079 in Case No. IPR2016-00541, U.S. Pat. No. 8,060,575 (11 pages).

Ex. 2079 in Case No. IPR2016-00542, U.S. Pat. No. 7,895,276 (12 pages).

Cross-examination transcript of John Guyer in Case Nos. IPR2016-00541 and IPR2016-00542, dated Jan. 27, 2017 (232 pages).

M. Silver et al., *Plan to Deal with Metadata Issues with Windows Vista*, Gartner (Dec. 21, 2005) (8 pages).

J. Kirk, *Gartner warns of metadata trouble with Vista OS*, Network World (Dec. 23, 2005) (3 pages).

Termination Decision in Case Nos. IPR2016-00541 and IPR2016-00542, dated Mar. 15, 2017 (4 pages).

Final office action U.S. Appl. No. 11/33,329 dated Aug. 15, 2012.†

Workshare Ltd. Workshare Protect User Guide 4.5. All pages, 2006.†

Mike Heck. "Keep Sensitive Data Out of-Email". InfoWorld.com, Apr. 24, 2006.†

Workshare Ltd. Workshare Protect Admin Guide 4.5. All pages, 2006.†

Greg Shultz. "Keep Microsof Office Documents Clean with iScrub." TechRepublic.com, Jul. 9, 2003.†

\* cited by examiner
† cited by third party

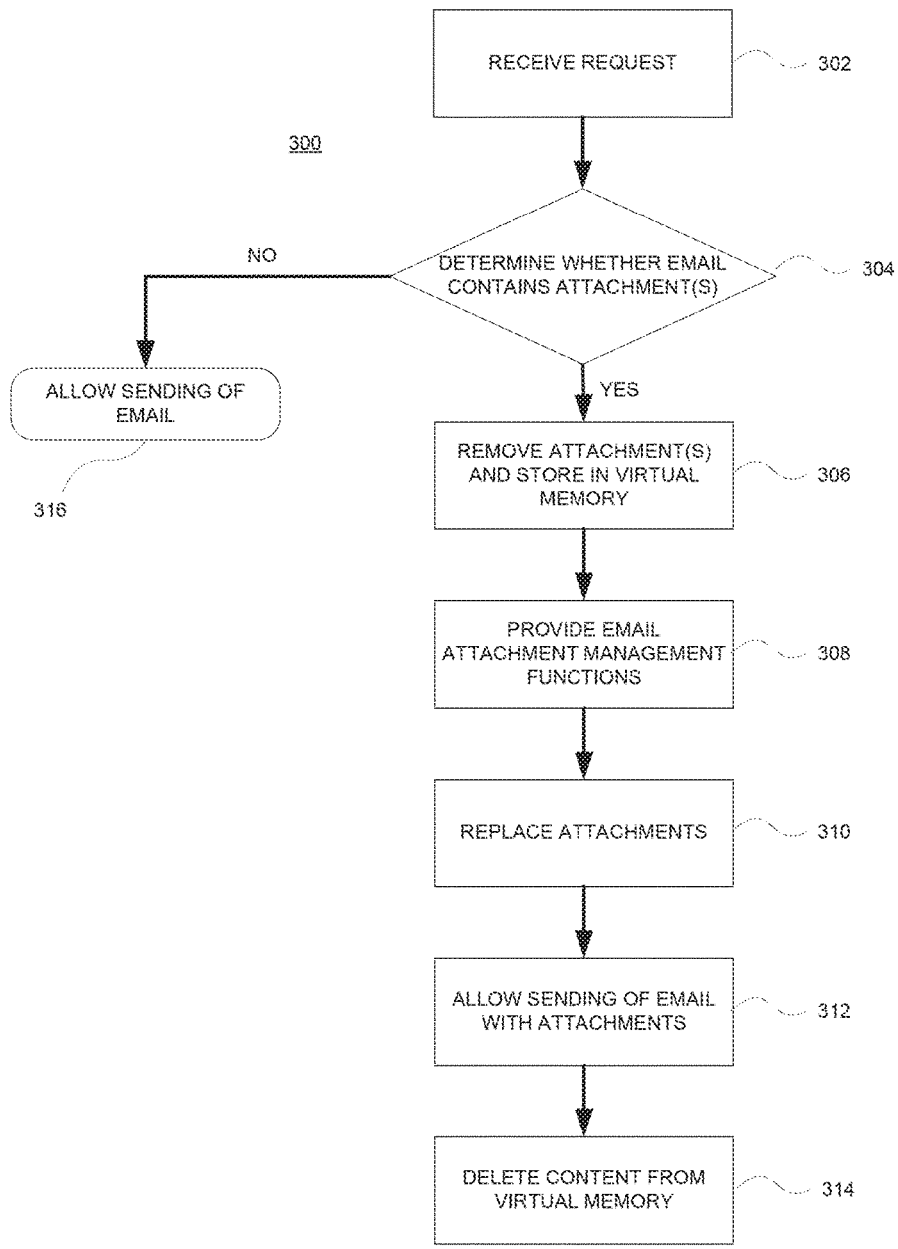

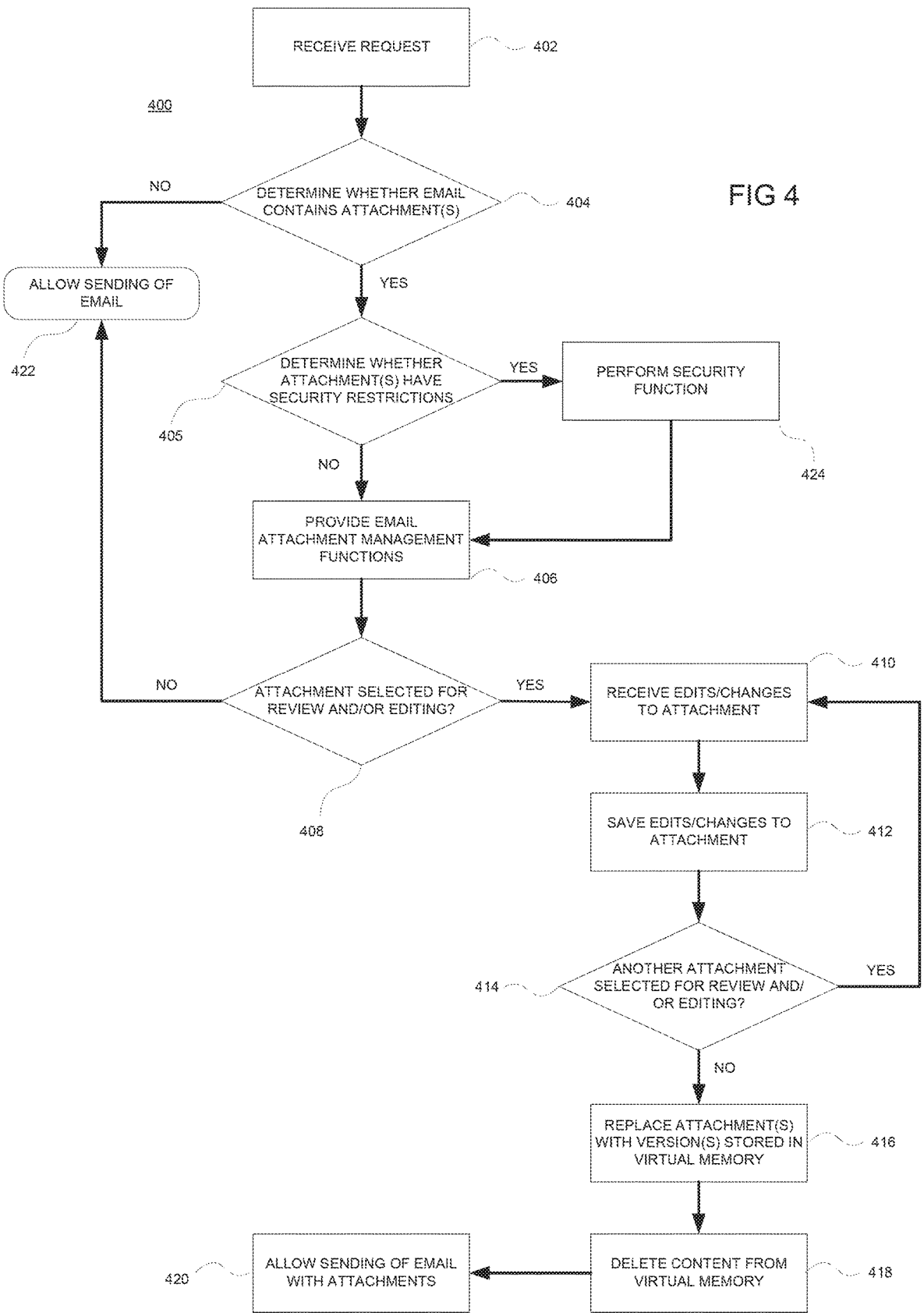

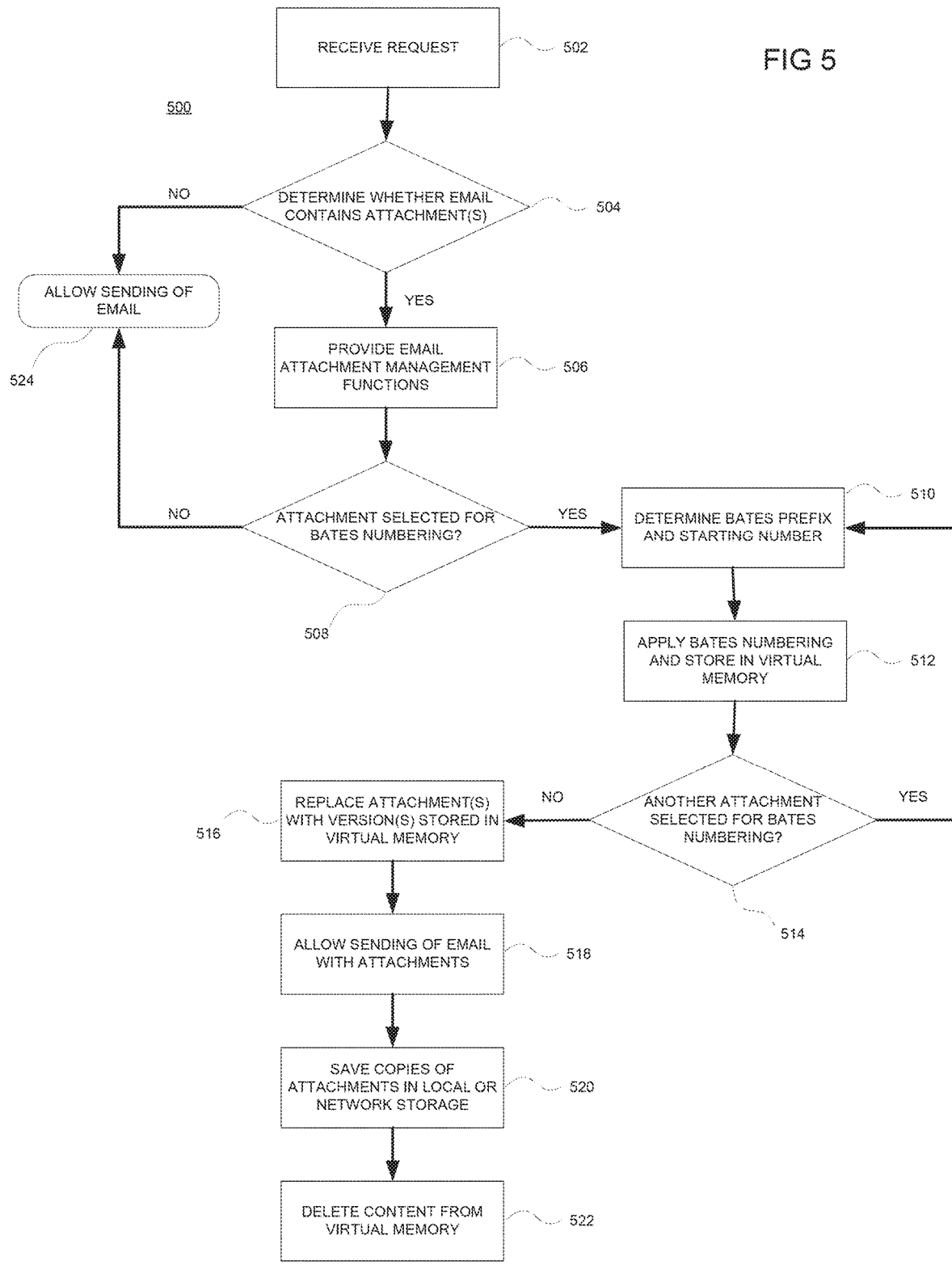

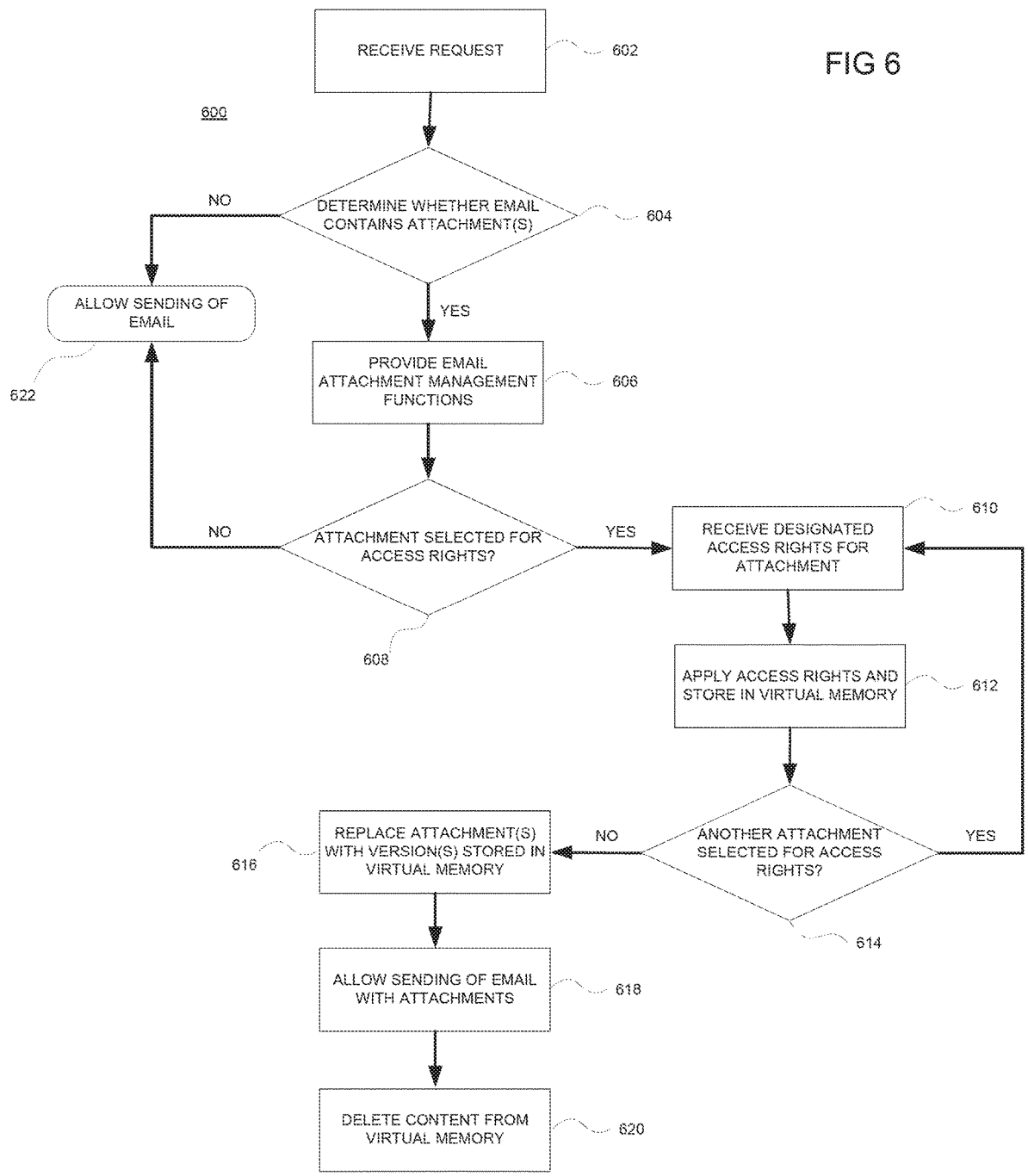

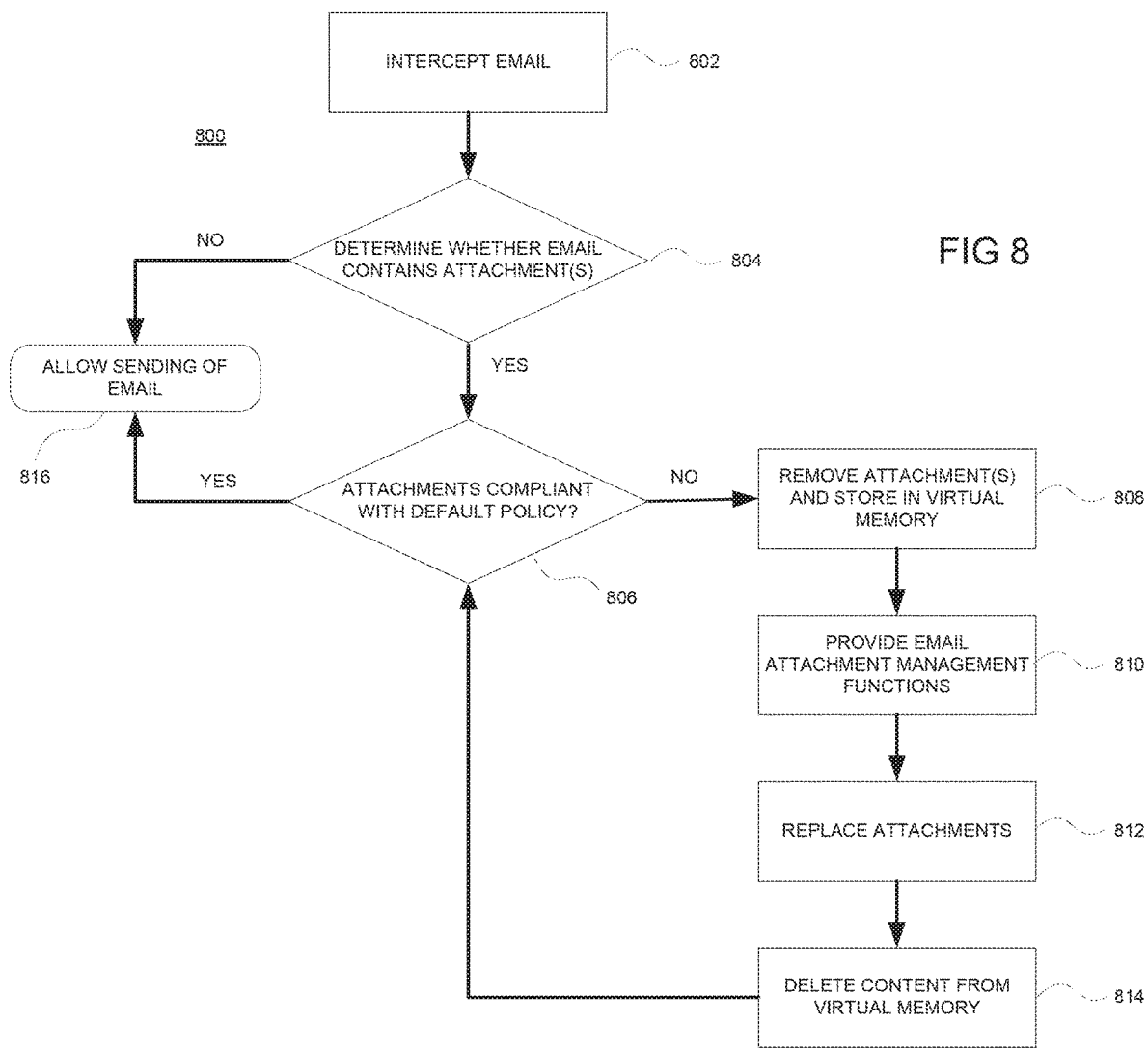

SYSTEMS AND METHODS FOR EMAIL ATTACHMENTS MANAGEMENT INCLUDING CHANGING ATTRIBUTES

RELATED APPLICATIONS

This application is a continuation of U.S. application Ser. No. 14/221,448, filed Mar. 21, 2014, which is incorporated herein by reference.

DESCRIPTION

Field

The disclosed embodiments generally relate to systems, methods, and articles of manufacture for managing electronic mail (email) attachments.

BACKGROUND

With the increasing versatility and convenience of the Internet for communications, email has become a prevalent means of sending and receiving content. Such content may be contained not only in an email message itself, but also in documents or files included with emails as attachments. Many email products, such as OUTLOOK, GMAIL™, HOTMAIL, YAHOO!® MAIL, etc. provide users with the ability to send and receive emails that may or may not contain email attachments.

While these types of products provide for sending emails with attachments, they do not provide enough versatility and convenience for efficiently managing email attachments. For example, conventional systems do not allow for the option for a user to generate a display window or interface that displays or modifies information associated with each attachment, including the type of file, the order of attachment, the binding of multiple files, the metadata-cleaning status of each attachment, etc. Nor do such systems allow for an interface that allows users to choose and perform multiple operations on one or more email attachments after they have attached the documents, such as PDF conversion, binding, metadata-cleaning, reordering of attachments, renaming of attachments, Bates-numbering, cover-page insertion, creating access rights, compare, calendar, security functions, content view, editor, collaboration, redact, etc.

Accordingly, there is a need for a method and system that provides greater versatility and convenience for managing email attachments regardless of how and in what format they are originally attached to an email.

SUMMARY

The disclosed embodiments provide, among other things, improved systems and methods of managing email attachments.

In one embodiment, a system is disclosed for managing email attachments. The system may include a memory storing software instructions and one or more processors configured to execute the software instructions to perform one or more operations. The one or more operations may include providing an interface for managing original attachments to an email. The one or more operations may also include converting the original attachment to a modified attachment in a variety of ways based on input received through the interface. The one or more operations may also include substituting the original attachment to the email with the modified attachment. In addition, the one or more operations may further include providing information to send the email with the modified attachment.

In another embodiment, a system is disclosed for managing email attachments. The system may include a memory storing software instructions and one or more processors configured to execute the software instructions to perform one or more operations. The one or more operations may include intercepting an email. The one or more operations may also include determining whether the email contains an original attachment. The one or more operations may also include determining, in response to determining that the email contains an original attachment, whether the original attachment complies with a default attachment policy. The one or more operations may further include, when the original attachment complies with the default attachment policy, providing information to send the email containing the original attachment. The one or more operations may additionally include, when the original attachment does not comply with the default attachment policy: (i) providing an interface for converting the original attachment; (ii) converting the original attachment to a modified attachment based on default policy and/or input provided through the interface; (iii) substituting the original attachment contained by the email with the modified attachment; and (iv) providing information to send the email containing the modified attachment.

In another embodiment, a system is disclosed for managing email attachments. The system may include a memory storing software instructions and one or more processors configured to execute the software instructions to perform one or more operations. The one or more operations may include intercepting an email containing an original attachment. The one or more operations may also include providing an interface for managing and modifying the original attachment. The one or more operations may also include converting original attachment to a modified attachment based on input received through the interface. The one or more operations may further include substituting the original attachment contained by the email with the modified attachment. In addition, the one or more operations may further include providing information to send the email containing the modified attachment.

In another embodiment, a system is disclosed for managing email attachments. The system may include a virtual memory, a memory storing software instructions, and one or more processors configured to execute the software instructions to perform one or more operations. The one or more operations may include removing an original attachment from an email. The one or more operations may also include storing the original attachment in the virtual memory. The one or more operations may also include providing an interface for converting the original attachment. The one or more operations may further include converting the original attachment to a modified attachment based on input received through the interface. The one or more operations may also include storing the modified attachment in the virtual memory. The one or more operations may additionally include attaching the modified attachment to the email. The one or more operations may also include providing information to send the email containing the modified attachment. In addition, the one or more operations may include deleting one or more of the original attachments or the modified attachments from the virtual memory.

Exemplary objects and advantages of the disclosed embodiments are set forth below, and in part will be obvious from the description, or may be learned by practice of the disclosed embodiments. Certain objects and advantages of the disclosed embodiments may be realized and attained by means of the elements and combinations particularly pointed out in the appended claims.

It is to be understood that both the foregoing general description and the following detailed description are exemplary and explanatory only and are not restrictive of the disclosed embodiments, as claimed.

The accompanying drawings, which are incorporated in and constitute a part of this specification, illustrate one (several) embodiment(s) of the disclosed embodiments and together with the description, serve to explain the principles of the disclosed embodiments.

BRIEF DESCRIPTION OF THE DRAWINGS

The accompanying drawings, which are incorporated in and constitute a part of this specification, illustrate various embodiments and aspects of the disclosed embodiments. In the drawings:

FIG. 3 is a flowchart illustrating an exemplary email attachment management process consistent with certain embodiments;

FIG. 4 is a flowchart illustrating another exemplary email attachment management process consistent with certain embodiments;

FIG. 5 is a flowchart illustrating another exemplary email attachment management process consistent with certain embodiments;

FIG. 6 is a flowchart illustrating another exemplary email attachment management process consistent with certain embodiments;

FIG. 8 is a flowchart illustrating another exemplary email attachment management process consistent with certain embodiments.

DESCRIPTION OF THE EMBODIMENTS

Reference will now be made in detail to exemplary disclosed embodiments, examples of which are illustrated in the accompanying drawings. Wherever possible, the same reference numbers will be used throughout the drawings to refer to the same or like parts.

Figure 1:
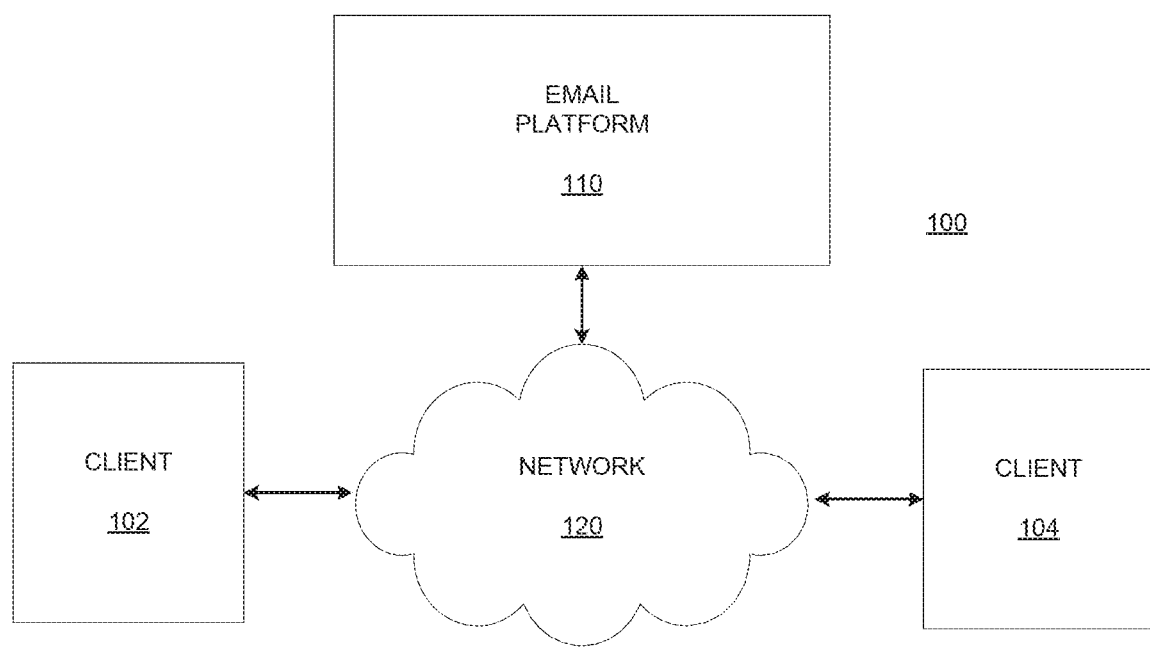
FIG. 1 illustrates an exemplary system environment consistent with disclosed embodiments.

FIG. 1 illustrates an exemplary system environment 100 consistent with certain disclosed embodiments. In one example, system 100 includes one or more clients 102, 104 that may be connected to a network 120 and can communicate email messages with one or more of each other. For example, in one aspect, clients 102 and 104 may be configured to send and receive emails containing one or more attachments over network 120. In certain embodiments, system 100 enables client systems 102, 104 to send and receive emails and email attachments over network 120 via an email platform 110. In one aspect, email platform 110 may provide email services and functions in a fully or partially distributed computing environment.

Client 102, 104 may be a computer system including one or more computing components for performing one or more processes consistent with certain aspects of the disclosed embodiments. In one embodiment, client 102, 104 may include one or more computer or data processing devices such as a PC, laptop computer, desktop computer, tablet, mobile phone, smart phone, or other mobile devices that have hardware (e.g., one or more processors, storage memory, data buses, network interface, etc.), software (e.g., web browsers, application programs, operating systems, add-ins for software programs or systems, other executable program code written in any known programming language such as PL/SQL, AJAX, XML, JAVASCRIPT™, C, C++, JAVA™, etc.), and/or firmware (e.g., software embedded in a hardware device). Client 102, 104 may be configured to communicate with one or more networks, such as network 120, and with other clients or servers connected to network 120, including other computers or components connected to a local network. One or more users may operate one or more components of client 102, 104 to perform one or more processes consistent with the disclosed embodiments. Also, client 102, 104 may be associated with an entity, such as a company, organization, government agency, educational or medical facility, firm, or any other type of business or non-business entity. In certain embodiments, client 102 may be associated with an entity that is different from that associated with client 104. Alternatively, client 102 and client 104 may be associated with the same entity. Further, client 102 may be associated with a department, division, etc. of an entity that is different from a department, division, etc. of the same entity associated with client 104.

Client 102, 104 may execute software processes stored on tangible and non-transitory computer-readable mediums that perform one or more processes consistent with the disclosed embodiments. While FIG. 1 illustrates two clients 102,104, aspects of the disclosed embodiments are not limited to such a configuration. Thus, the disclosed embodiments may be implemented with any number of clients interconnected by one or more networks, including but not limited to network 120. Further, the term "client" used herein to describe client 102, 104 is not intended to be limiting to a client in the sense of known client-server configurations, although such configurations may be implemented by the disclosed embodiments. For example, client 102, 104, may be (or include) a server type computer system or server software that may also request and receive information, data, services, processes, etc. from another computer system in a local and/or remote network.

In one embodiment, client 102, 104 may employ hardware, software, or firmware to create, save, send, receive, delete, and the like, one or more emails, to which client 102, 104 may include attachments. An attachment may be selected from any type of file, such as a document, a spreadsheet, a text file, an image, a database, a temporary buffer, a web-page, an email, a worksheet, a .PDF, .DOC, .EXE, PPTX or .XLS file, or any other type of file or structure used to store information. An attachment may also be a folder or sub-folder containing one or more files, or a combination of one or more files, including but not limited to bound files, merged files (e.g., PDFs), .ZIP and other types of files. In certain aspects, an attachment may also have certain access rights associated with it, e.g., read-only, edit-only, comment-only, etc. In still other aspects, an attachment may have security classifications associated with it, e.g., Confidential, not available for sending, etc. The above-listed examples of attachments are not intended to be limiting of the scope of the disclosed embodiments.

In one embodiment, client 102, 104 and their respective user(s) or entity(ies) associated with client 102, 104 may be a sender or recipient of an email. For example, a client 102, 104 may be operated by a sender to create, maintain, save, store, or otherwise prepare an email. A client 102, 104 may additionally be operated by a sender to attach one or more attachments to an email. Client 102, 104 may also be operated or configured by a recipient to receive or otherwise obtain an email from a sender (directly or indirectly). In certain aspects, a recipient may receive or otherwise obtain an email that may contain or more attachments, from a sender. For example, client 102 (and/or a user of client 102) may be a sender and client 104 (and/or a user of client 104) may be a recipient of emails and attachments sent by client 102. Further, client 102 may be a recipient of emails and attachments sent by client 104. Other clients (not shown) may also be implemented such that each may be operated by senders, recipients, or both, respective to other clients.

Network 120 may be any type of communication network configured to communicate information in system 100. Network 120 may be a wireless and/or wireline network including one or more components (e.g., hardware, software, and/or firmware) configured to receive, route, translate, and deliver information. For example, network 120 may be the Internet, an Extranet, an Intranet, a Local Area Network, Wide Area Network, etc., and combinations of such exemplary networks, that enables clients (or other computer systems) to communicate and collaborate in accordance with aspects of the disclosed embodiments. Network 120 may include infrastructure that implements the communication of information over these types of networks, such as routers, bridges, servers, wireless/wireline base stations, transceivers, and related technology. In certain embodiments, network 120 may be separate networks that connect client 102 to email platform 110 and that connect client 104 to email platform 110. For example, network 120 may include a local area network, wide area network, portions of the Internet etc. that provide connections between client 102 and platform 110 that is different (in whole or in part) than a local area network, wide area network, portions of the Internet etc. that provides connections between client 104 and platform 110.

Email platform 110 may be a system that provides email functions, applications, and other types of services consistent with the disclosed embodiments. In one example, email platform 110 may be a web-based email system that interconnects with one or more clients, such as clients 102, 104, over the Internet. In another example, email platform 110 may include one or more servers and memory storage devices that host or provide email applications and/or services. Email platform 110 may include one or more computer or data processing devices that have hardware (e.g., one or more processors, storage memory, data buses, network interface, etc.), software (e.g., web browsers, web servers, application programs, operating systems, add-ins for software programs or systems, MS Exchange, LOTUS Notes, or any other executable program code written in any known programming language such as PL/SQL, AJAX, XML, JAVASCRIPT™, etc.), and/or firmware (e.g., software embedded in a hardware device). Email platform 110 may also include one or more memory devices, such as local or networked memory storage media, shared memory platforms, or a combination thereof. In certain embodiments, email platform 110 includes memory that stores emails, folders of emails, documents, email attachments, information, data, etc. for sending, receiving, and viewing by clients 102, 104 through a browser or similar type of software application. In certain embodiments, email platform may be incorporated into a client, and in other embodiments it may be separate from client, and connected to client by network 120. In certain aspects, email platform 110 may be a system that provides other functionalities in addition to the email functionalities disclosed herein.

In accordance with certain disclosed embodiments, email platform 110 may temporarily provide access to emails, attachments, documents, content, etc. in a virtual memory during communication sessions with a client (e.g., client 102,104), and delete the content from its virtual memory at the end of a communication session with the client. In certain embodiments, virtual memory may be a physical memory that is configured to temporarily store content that may be used to by platform 110 to provide email and attachment(s) to one or more users (e.g., reviewers) via client 102, 104. For example, email platform 110 may include a virtual memory that may be configured to temporarily store content (e.g., documents, folders, data, files, etc.) that may be used by email platform 110 to provide email and attachment content to reviewers via browser software executed at the recipient client computer. Email platform 110 may be configured to delete the content from the virtual memory when a communication session ends with the recipient computer (e.g., client 102, 104) such that the recipient computer does not retain copies of the content (including an attachment, document, etc.) in temporary cache memory of the recipient's browser. Thus, unlike typical web servers that may load content into a temporary memory on the server that is accessible by users after a communication session ends with the users, email platform 110 may use a virtual memory dedicated to store email and attachment content that is deleted after communication sessions end with users and/or their associated computer systems (e.g., client 102, 104) accessing that content.

Email platform 110 may be configured to execute software that performs processes consistent with the disclosed embodiments. For example, email platform 110 may perform one or more security processes that intercept and/or control access to emails, attachments, documents, folders of documents, or any other content that may be displayed and processed by email platform 110 during a communication session with one or more clients 102, 104. Email platform 110 may also perform processes that enable clients 102, 104 (or their users) to send, receive, save, store, archive, and the like, emails, attachments, documents, folders of documents, or other content over network 120. In certain disclosed embodiments, email platform 110 may also provide attachment management operations, such as PDF conversion, binding, metadata-cleaning, reordering of attachments, renaming of attachments, division of attachments into one or more additional attachments, division of attachments into one or more additional emails, Bates-numbering, cover-page insertion, separator sheet insertion, creating access rights, content viewer, editor, collaboration, redact, approval, compare, clean metadata, reporting, and/or administrative applications, calendar, and security functions. Email platform 110 may also execute software that allows multiple clients or their users to simultaneously log-in and interact through hosted communication applications, such as instant messaging or other real-time communications functions. In addition to email, platform 110 may also provide message boards, private messaging, wall postings, and various other methods of electronic communication known in the art.

Figure 2A:
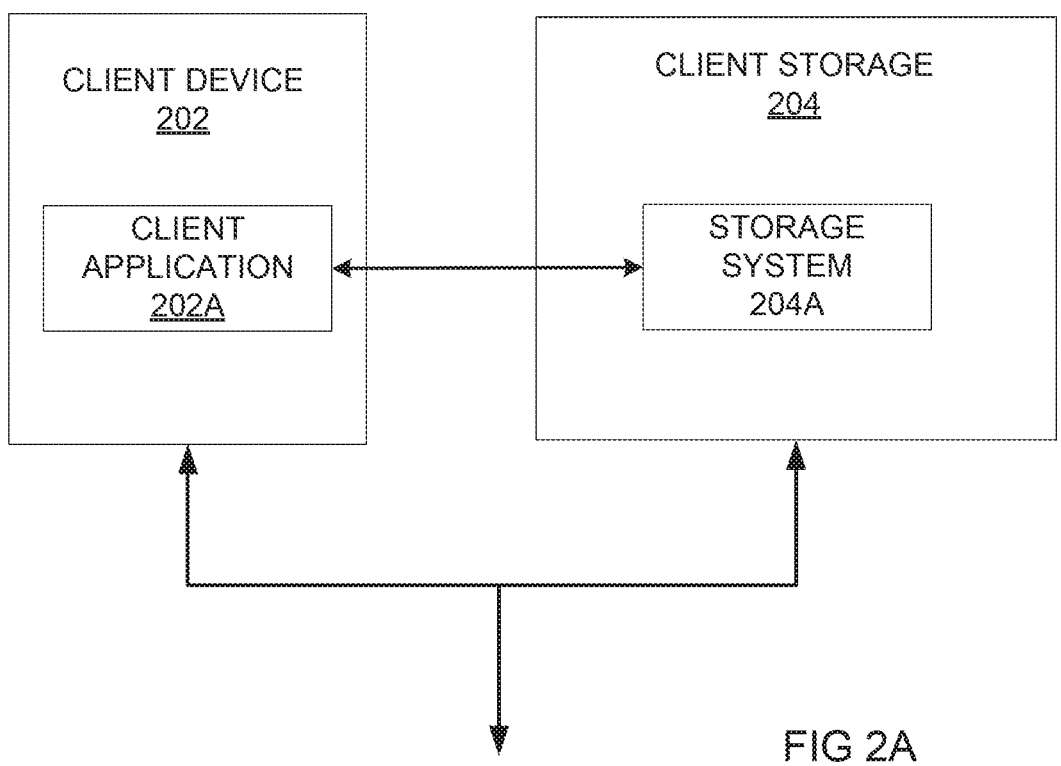
FIG. 2A illustrates another exemplary system environment, consistent with disclosed embodiments.

FIG. 2A shows components of an exemplary client consistent with the disclosed embodiments. The illustration, descriptions, functionalities, and operations disclosed in connection with client 102 are also applicable to client 104 (or other clients that may be implemented in system 100). As shown, client 102 may include one or more client devices 202, one or more client storages 204, and one or more client applications 202A and storage systems 204A.

Client device 202 may be one or more computer systems configured to execute software, create, edit, modify, manage, etc. documents, and send and receive documents. For example, client device 202 may be a desktop PC, a laptop, a PDA, a workstation, tablet, cell phone device, smart phone device, or any other processor, computer, or device (or group thereof) configured to locally or remotely execute software, send and receive information over a network, such as the internet, and perform data processing operations. In one embodiment, client device 202 may include one or more computer or data processing devices that have hardware (e.g., one or more processors, storage memory, data buses, network interface, etc.), software (e.g., web browsers, application programs, operating systems, add-ins for software programs or systems, other executable program code written in any known programming language such as PL/SQL, AJAX, XML, JAVASCRIPT™, etc.), and/or firmware (e.g., software embedded in a hardware device).

One or more users may operate client device 202 to perform functions consistent with certain disclosed embodiments. In certain embodiments, client 202 may execute software that performs processes that access one or more client storage 204, and may also access email platform 110. In one embodiment, client device 102 may execute one or more client applications 202A, which may be software applications that work with emails, attachments, documents, data, content or other types of information. For example, client application 202A may include an email application, such as MICROSOFT OUTLOOK™, a word processing application, a spreadsheet application, a document management system (DMS) client application, and/or a document collaboration application, such as Google Docs, Zoho, or a Litera IDS client. Client device 202 may also include one or more client applications 202A that provide different types of features, such as email, document creation and editing, document comparison, PDF, printing, extraction, redaction, web-page related applications, graphical drawing applications, financial service applications, etc., without departing from the features of the disclosed embodiments.

In one embodiment, through client application 202A, client device 202 may host and provide one or more of the following services and capabilities for managing email attachments: PDF conversion, binding, metadata-cleaning, reordering of attachments, renaming of attachments, division of attachments into one or more additional attachments, division of attachments into one or more additional emails, Bates-numbering, cover-page insertion, creating access rights, content viewer, editor, collaboration, redact, approval, compare, clean metadata, reporting, administrative applications, calendar, and/or security functions, etc. For example, a client 102 (automatically (based on programmed instructions) or in response to input from a user of client 102) may attach one or more files to an email message utilizing application 202A. Consistent with certain embodiments, application 202A may then provide information used to generate an interface displaying information relating to the attachments, such as the type(s) of file, the order of attachment, the binding or metadata-cleaning status of each attachment, the storage locations of each attachment, etc.

Consistent with certain disclosed embodiments, client 102 may, in response to input from a user of client 102, for example, select one or more options in the interface to manage and organize the attachments before sending to a recipient, such as by converting to another file type, revising the order of attachments, revising the file names of attachments, binding one or more attachments, cleaning metadata, Bates-numbering, creating access rights, etc.

Client storage 204 may be one or more local or network memory storage media, or internal and/or external network-based document or data management systems. For example, client storage 204 may include one or more storage systems 204A that include one or more computer systems (e.g., database servers) and one or more tangible non-transitory storage media, such as one or more databases, hard drives or other types of storage devices. Storage system 204A may include, for example, a document management system (DMS), such as SHAREPOINT®, DESKSITE®, AUTONOMY IMANAGE AUTONOMY IMANAGE, OPENTEXT TEMPO™, WORLDDOX®, NETDOCUMENTS®, DROPBOX, BOX.NET, LITÉRA SYNC or network storage. Client storage 204 may be configured to execute one or more processes consistent with certain disclosed embodiments. In certain embodiments, storage system 204A may store original emails, attachments, and documents created by an owner user using client application 202A executed by client device 202. Storage system 204A may also store versions of emails, attachments, and documents that may include changes made by the owner or one or more reviewers through application 202A or platform 110. In certain embodiments, client storage 204 may provide access to documents and folders of documents through client device 202 to select emails, attachments, data, documents, folders of data or documents, or other content over email platform 110. Although FIG. 2A shows client device 202 and client storage 204 as separate components, the disclosed embodiments may implement single computer systems that operate as a client device 202, client storage 204, or any combination thereof.

Figure 2B:
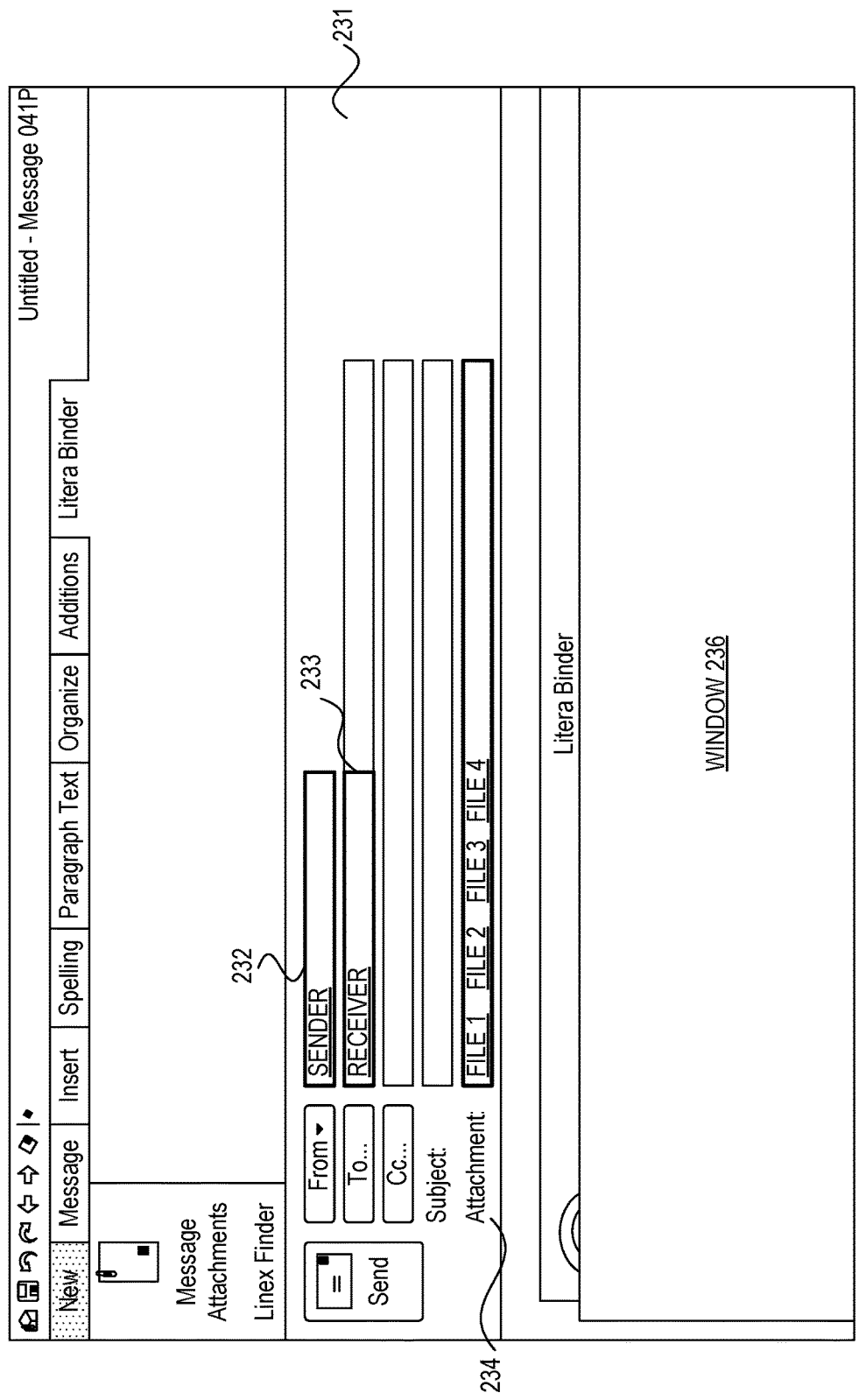
FIG. 2B is a diagram illustrating an exemplary interface reflecting certain aspects consistent with disclosed embodiments.

FIG. 2B shows an exemplary interface 230 consistent with certain disclosed embodiments. Interface 230 may include one or more fields, windows, menu options, and the like. For example, interface 230 may include a sender field 232 that may identify a sender of an email. In certain aspects, the sender may be the user that is operating client 102, 104 that presents interface 230 on a display screen of client 102, 104 and is creating the email. Interface 230 may also include a receiver field 233 that identifies a receiver of the email. Interface 230 may also include an attachment field 234 that identifies one or more attachments (e.g., File 1 to File 4, as shown) that may be attached to the email.

Through interface 230, for example, a user (e.g., sender) operating client 102, 104 may create an email 231 using, e.g., application 202A or any other email application or service, such as an email application provided by email platform 110. The sender, through client 102, 104, may attach to the email 231 one or more documents or files in the attachments field 234. Consistent with certain disclosed embodiments, the email application or service may display an interface 230 to permit the sender operating client 102, 104 to manage one or more aspects of the attachments, e.g. those in field 234. Interface 230 may be accessed in several different ways, including by the client selecting an option on a toolbar of the email application, by the client selecting a link/button/icon on their tablets or mobile devices, by the client selecting an attachment in field 234, by the client selecting an option to send an email whereupon the interface 230 is displayed before sending, or by any other means of a menu option, hot key sequence, or other option for initiating a request to access interface 230.

Figure 2C:
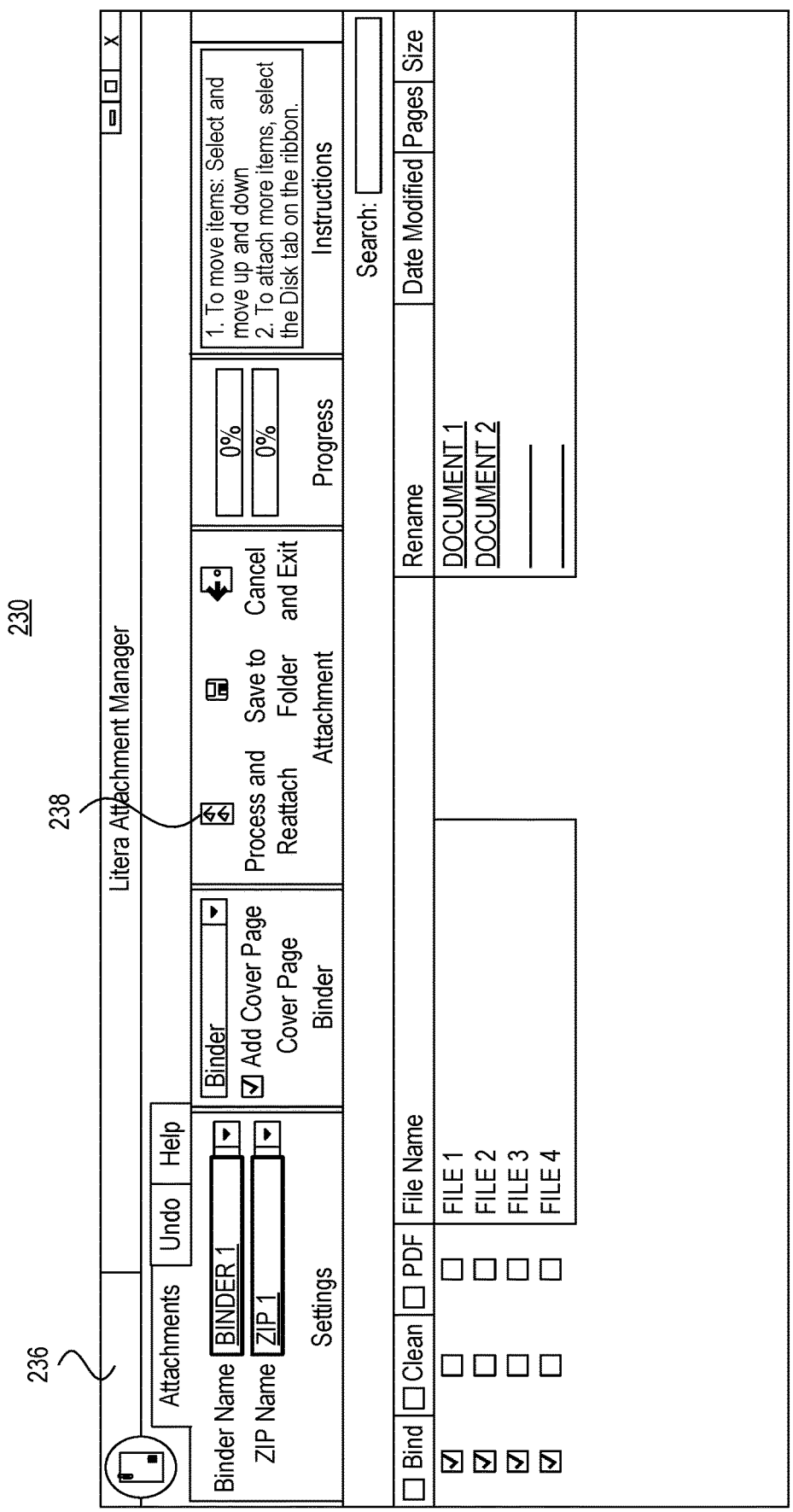
FIG. 2C is a diagram illustrating another exemplary interface reflecting certain aspects consistent with disclosed embodiments.

Within interface 230, a sender 232 may select one or more options to manage email attachments consistent with disclosed embodiments. As shown, in FIGS. 2B and 2C, interface 230 may include a window (or pane or field) 236 containing one or more links or listing file names for each of the attachments in attachment field 234: File 1, File 2, File 3, File 4. Files 1-4 may be files of a single type, or may be files of two or more different types, and may be originally attached to email 231 in a specified order and as a specified file type. For each attachment in window 236, the disclosed embodiments may execute software instructions that perform processes that enable a sender operating client 102, 104 to select one or more email management operation options, such as renaming them, converting to PDF, clean metadata, bind, zip, rename, reorder, add cover page, etc. A sender may select and perform one or more email management options within the window 236 or within another window or sub-window (not shown) opened to enable one or more of the email management options. As illustrated in FIG. 2C, for example, a sender may provide input that client 102, 104 may use to perform processes to rename attachment "File 1" to "Document 1," change the order of one or more attachments, such as switching the order of File 3 and File 4, convert one or more attachments in window 236 to another file type (e.g., PDF), clean metadata, and bind them together or Zip them together. The disclosed embodiments may provide to the sender one or more options that may be selected by any means known in the art, such as by clicking checkboxes with a mouse, utilizing toolbar options, hot-key sequences, drag-and-drop, etc. Other email management operation options (not shown) may include Bates-numbering documents, creating access rights, content viewer, editor, collaboration, redact, compare, reporting, administrative applications, calendar, security functions, local or non-local storage of revised attachments, etc.

Following the sender's completion of managing attachments in interface 230, client 102, 104 may execute the email application 202A to update the email 231 to reflect the changes and edits to the email attachments in field 234. As one example, within interface 230, a sender may close the interface or select a toolbar option (e.g., Process and Reattach 238), whereupon the email application may substitute or reattach the revised attachments in place of the original attachments in the email 231. In one aspect, email application 202A may, in response to input from a sender, substitute attachments which may have been file types other than a first file format (e.g., PDF) for revised attachments that are in another format (e.g., PDF format). In other aspects, application 202A may perform processes to substitute attachments originally attached in a certain order for revised attachments in a different order. In still other embodiments, application 202A may perform processes that substitute attachments in field 234 which may have been attached as separate files for one or more bound attachments, or for one or more individual folders or .ZIP files. In still other embodiments, application 202A may receive instructions from a sender via interface 230, and separate two or more attachments in field 234, such that one or more is attached to one email, while one or more is attached to a different email (e.g., by providing a selection box, menu option, drag-and-drop function, etc. to attach to one or more emails), instead of attaching all to a single email. In still other embodiments, application 202A may receive instructions from a sender to process attachments in field 234 with Bates numbering in interface 230, whereupon certain original attachments in field 234 may be substituted out for certain revised attachments that include Bates numbering on one or more pages. In still further embodiments, email application 202A may process attachments in field 234 in response to input from a sender to include restrictive access rights, and substitute the original attachments for the revised attachments that include the access restrictions on designated recipients, such as those listed in field 233. In still other embodiments, email application 202A may process attachments in field 234 in response to input from a sender to include redacting specified text or patterns such as social security numbers or proper nouns in the selected attachments.

During the management of email attachments with an exemplary interface 230, a sender operating interface 230 via client 102, 104 may additionally open and view the attachments listed or linked in window 236. Operating email application 202A, a sender may further edit or revise the content of those documents, and client 102/104 operating application 202A may execute processes to save or store the changes in local, network, virtual memory, or in a DMS as replacements or new versions. Following revisions to the content of attachments 234, application 202A may execute processes that substitute the original attachments for the revised attachments that include the content edits.

In one aspect, once the attachment management process is complete, and application 202A has substituted any revised attachments for the original attachments, a sender operating the email application may provide email 231 to one or more recipients, which may be designated either as direct recipients or copy ("CC") recipients (e.g., in field 233), through, for example, network 120 and/or email platform 110.

FIG. 3 is a flowchart of an exemplary email attachment management process that may be performed by one or more components of system 100 consistent with certain disclosed embodiments. Depending on the type of application, each step of process 300 may be performed by client 102 (or client 104), or in other embodiments by email platform 110, or in still other embodiments by a combination of client device 102 and email platform 110. In one embodiment, client 102 may receive a request to initiate attachment management (step 302) with respect to an email message containing attachments. For example, the client 102 may receive a request from a user in the form of a user selecting an option to send an email message. In other examples, client 102 may receive a request in the form of a user's selection of a toolbar option, selecting an attachment, or using a hot-key sequence. In other aspects, the client 102 may be configured by a user to (automatically or in response to user input) intercept an email, and thereby initiate attachment management. In still other examples, email platform 110 may receive a request to initiate attachment management, such as by intercepting a sent email, or by the user's selection of a toolbar option, selecting an attachment, using a hot-key sequence, or any other means of indicating a request to initiate attachment management within an application supported, enabled, or provided by platform 110. With respect to process 300 and one or more variations on process 300 that will be apparent to those of skill in the art, the illustrations, descriptions, functionalities, and operations disclosed in connection with client 102 are also applicable to platform 110, and vice versa.

In step 304, client 102 and/or platform 110 may determine whether the email contains any attachment(s). For example, client 102 and/or platform 110 may query the email and return a list of attachments (e.g., files) to the email. If client 102 and/or platform 110 detects attachments, and the user selects an attachments management option (e.g., by the sender's selecting of a toolbar option, selecting an attachment, using a hot-key sequence, or any other means of indicating a request to initiate attachment management within an application supported, enabled, or provided by client 102 and/or platform 110), the attachment(s) may be removed or copied from the email and stored in virtual memory in step 306. If no attachments are detected, then client 102 and/or platform 110 may perform operation(s) to allow the email to be sent (step 316). In step 306, if attachments were detected, client 102 and/or platform 110 may perform operation(s) to remove them from the email and store the attachments in virtual memory, making them available for a user operating client 102 to review, edit, and/or revise them before later reattachment to the email. If client 102 and/or platform 110 perform operation(s) to copy attachments from the email in step 306 and store them in virtual memory, the attachments may similarly be available for a user operating client 102 to review, edit, and/or revise before later reattachment to the email (e.g., selective reattachment of revised attachments or reattachment of all copied attachments, whether or not revised). Such removal or copying of attachments may enable editing and review of the attachments, e.g., within an application such as application 202A, that is more convenient and versatile than requiring a user to return to local or network memory, opening up the original file used as an attachment, and editing and/or reviewing that original file before reattaching to an email.

In step 308, client 102 or platform 110 may be configured to perform one or more management operations. In one aspect, client 102 and/or platform 110 may perform processes that generate for display a user interface including one or more attachments and/or links to attachments. The interface may also include one or more menus, options, selections, etc. to enable a user to revise, edit, configure, customize, and the like, the attachments, consistent with disclosed embodiments. For example, a sender may, through client 102 and/or platform 110, edit, revise, or otherwise configure attachments through one or more of the nonlimiting operations described herein, such as binding, metadata-cleaning, reordering of attachments, renaming of attachments, PDF, Bates-numbering, cover-page insertion, creating access rights, etc.

In another embodiment, client 102 and/or platform 110 may be configured to substitute one or more of the revised attachments, and reattach them to the email (e.g., step 310). For example, if the original attachments were removed from the email, then all attachments from the email stored in virtual memory may be attached to the email. In other embodiments, if client 102 and/or platform 110 did not remove the original attachments, but instead copied them (e.g., in step 306), then client 102 and/or platform 110 may perform operation(s) to delete the original attachments and attach the revised attachments in step 310. In still other embodiments, all attachments from the email stored in virtual memory, whether or not edited or revised, may be substituted for the original attachments. After completing the attachment substitution and reattachment process, client 102 and/or platform 110 may permit the sending of the email containing the attachments in step 312. For example, in one aspect, after client 102 and/or platform 110 has completed step 310, it may receive input from a user to send an email and then provide information to send the email to one or more designated recipients. After the sending of the email, client 102 and/or platform 110 may perform processes to delete the stored attachments and content in virtual memory, such that the virtual memory no longer contains either the original or edited/revised attachments (e.g., step 314). In certain embodiments, the order of steps 312 and 314 may be reversed, such that the stored attachments and content in virtual memory may be deleted after reattachment to the email in step 310, but before the email is sent.

FIG. 4 is a flowchart illustrating another exemplary email attachment management process 400 consistent with certain disclosed embodiments. Attachment management process 400 may be performed by one or more components of system 100, including but not limited to client 102 and/or email platform 110. In certain embodiments, a sender (e.g., a user operating client 102) may select specific email attachments for reviewing and editing, e.g., though an interface 230 such as the one disclosed above in connection with FIG. 2B. In additional embodiments, client 102 and/or platform 110 may perform operation(s) to save edits to attachments, which may be stored in virtual memory. In certain aspects, the disclosed embodiments may store any changes to one or more attachments until client 102, 104 and/or platform 110 has completed attachment management process 400 before reattaching. In yet additional embodiments, a sender operating client 102 and/or platform 110 may save edits and changes to attachments, and substitute revised attachments for the original attachments to an email periodically throughout the attachment management process 400.

In one embodiment, client 102, 104 and/or platform 110 may receive a request to initiate attachment management (step 402). For example, the request may be a user operating client 102 to send an email message and/or the intercepting of an email by client 102 or platform 110. In other examples, the request may be a selection of a toolbar option, selecting an attachment, using a hot-key sequence, the intercepting of an email, or any other means of requesting to initiate attachment management by a user operating client 102. Such a request may be received by one or more components of system 100, including but not limited to client 102 or email platform 110, which may then also perform one or more of the remaining steps of exemplary process 400. With respect to process 400 and variations on process 400 that will be apparent to those of skill in the art, the illustrations, descriptions, functionalities, and operations disclosed in connection with client 102 are also applicable to platform 110, and vice versa.

In step 404, platform 110 may determine whether the email contains attachments. If not, platform 110 may, for example, perform processes to send or forward the email to one or more designated recipients (step 422). If it is determined that the email contains one or more attachments, additional attachment management functions may be provided. In one aspect, in step 405, platform 110 may determine whether one or more attachments has a security classification associated with it (e.g., Confidential, not available for sending, etc.). If so, in step 424, platform 110 may perform security functions, which may include stripping such security-classified attachments from the email, creating a log entry documenting the email and attachment(s), sending a message to alert the sender and/or an administrator, terminating process 400, or permitting process 400 to proceed.

In step 406, client 102, 104 and/or platform 110 may execute processes that generate a user interface or window (e.g., interface 230) for display that may include one or more selections, menus, options, etc. to enable a user to revise, edit, configure, customize, and the like, the attachments to the email. For example, client 102, 104 and/or platform 110 may perform operations that enable a sender to edit, revise, or otherwise configure attachments through one or more nonlimiting operations, which may include binding, metadata-cleaning, reordering of attachments, renaming of attachments, PDF, Bates-numbering, cover-page insertion, creating access rights, security restrictions, etc.

In one aspect, in step 406, email platform 110 may receive a request or determine whether an attachment has been selected by a sender for review and/or editing in step 408. If platform 110 does not receive a selection from a sender of any attachments for review, editing, or any other email attachment managing purposes, then platform 110 may permit the sending of the email with the one or more attachments in their original, as-attached format (step 422). If an attachment is selected, then the sender operating client 102 may make edits and changes to the attachment in step 410 within the management functions initiated and provided in earlier step 406. Consistent with certain embodiments, the sender may make these edits changes within an interface or window (e.g., interface 230) provided or displayed by one or more components of system 100. After changes are made to an attachment, platform 110 may save these changes and store the updated attachment in virtual memory in step 412. The saving and storing of updated attachments may occur by any of the many means known in the art, including the sender selecting within interface 230 an option to save from a drop-down menu, selecting an option on a tool-bar, through the use of a hot-key sequence or combination, through the closing of an attachment, etc.

In step 414, following the saving and storing of one updated attachment, email platform 110 may receive a request or determine whether another attachment has been selected by a sender (e.g., a user operating interface 230) for review and/or editing. If so, process 400 returns to step 410 and the process of receiving edits and/or changes to attachments and saving and storing them in steps 410 and 412 are repeated. The selection of another attachment may include, for example, a user operating client 102 to select, within interface 230, a different attachment than one that has already been edited or changed and stored in virtual memory, or it may be the re-selection of an attachment that has already been edited or changed during email attachment management process 400. In step 416, if it is determined that no additional attachment has been selected for review and/or editing, then email platform 110 may replace the original attachments to the email with the corresponding revised or updated attachments stored in virtual memory. Afterwards, platform 110 may empty the virtual memory, store the attachments deleted in step 418, and then permit the sending of the email containing one or more attachments in step 420. In one aspect, after client 102 and/or platform 110 has completed step 418, it may receive input from a user to send an email and then provide information to send the email to one or more designated recipients.

In certain embodiments, the operations in steps 414, 416, and 418 may be reversed or otherwise occur in a different order, such that an original attachment is substituted or replaced with a revised or updated attachment following the saving and storing of edits and/or changes to that attachment in virtual memory. Accordingly, in certain embodiments, attachments may be reviewed, edited, and/or changed and the revised attachments may be then attached to the email in the place of the original attachments before the process 400 step of determining whether another attachment has been selected for review and/or editing (e.g., step 414). Similarly, in certain embodiments, following the replacement of an original attachment with a revised version of an attachment to an email in step 416, process 400 may include the step of deleting the stored version of the attachment from virtual memory (step 418) before proceeding to determine whether another attachment has been selected for review and/or editing during email attachment management (step 414). Other rearrangements and reordering of one or more steps in process 400 may also occur without departing the spirit and scope of the disclosed embodiments.

Certain embodiments may also perform additional operations or process steps specific to one or more aspects of an email attachment management process or system. These additional operations or process steps may relate, as certain examples, to means of managing email attachments through features such as PDF conversion, binding, metadata-cleaning, reordering of attachments, renaming of attachments, Bates-numbering, cover-page insertion, creating access rights, content viewer, editor, collaboration, redact, approval, compare, clean metadata, reporting, and/or administrative applications, calendar, security functions, etc. Such operations and/or process steps may be utilized or enabled through a review/editing function provided by one or more components of system 100, including but not limited to interface 230. As one example, a user operating interface 230 may reorder attachments by clicking and dragging attachments displayed in interface 230, or by utilizing keyboard sequences, etc. As another example, a user operating interface 230 may bind attachments or convert them into .ZIP folders or files, in certain embodiments, by selecting checkboxes, menu options, and the like, within interface 230. Operation of process 400 in conjunction with one or more other processes or subprocesses for managing email attachments is fully consistent with the scope of the disclosed embodiments.

Still additional types of features for email attachment management, consistent with certain disclosed embodiments, may involve further operations and/or process steps. For example, FIG. 5 is a flowchart illustrating an exemplary process 500 for providing Bates numbering functions during email attachment management, which may occur as a subprocess of one or more of processes 300 or 400, or may otherwise overlap with those processses. Process 500, as with other exemplary processes disclosed herein, may be performed by one or more components of system 100, and may further include functionalities of various software or applications, such as application 202A. In step 502, client 102 may receive a request from a user to initiate attachment management. Consistent with other disclosed embodiments, the request may be a user operating client 102 to send an email message or select a toolbar option, select an attachment, use a hot-key sequence, the intercepting of an email by client 102, or any other means of requesting to initiate attachment management. Such a request may be received by a client 102 or an email platform 110, or any other component of system 100, which may then perform one or more of the remaining steps of process 500 either alone or in combination with other components. With respect to process 500 and variations on process 500 that will be apparent to those of skill in the art, the illustrations, descriptions, functionalities, and operations disclosed in connection with client 102 are also applicable to platform 110, and vice versa.

In step 504, for example, client 102 may determine whether the email contains one or more attachments. If not, client 102 may perform processes to send or forward the email to one or more designated recipients (step 526). If client 102 determines that the email contains at least one attachment, it may provide attachment management functions in step 506. This may include, for example, displaying an interface or window to permit a sender to perform various revisions and/or editing of attachments (e.g., by operating interface 230). In step 508, client 102 may determine whether an attachment has been selected for Bates numbering. In certain disclosed embodiments, a sender operate client 102 to select an attachment for Bates numbering by clicking a check box in interface 230, by selecting menu options, or through any other means known in the art.

In step 510, client 102 may determine the appropriate Bates prefix (e.g., "ABC") and starting number (e.g., "00001") for the selected attachment. Certain embodiments may prompt a sender to type in a prefix through interface 230, or select an option from a toolbar, menu, window, etc. to select a preexisting prefix. In certain embodiments, client 102 may save and store prefixes, such that those prefixes may be used periodically over time as additional documents are included as email attachments and numbered according to the same Bates sequence. Similarly, certain embodiments may prompt a sender to type in a starting number for the Bates numbering of an attachment, or to select a starting number from a toolbar, menu, window, etc. In certain aspects, client 102 (e.g., operating application 202A) may track and store Bates-numbered documents and their corresponding Bates numbers that have been used in the past, and provide options to a sender to begin utilizing the next number in the sequence during step 510. As other examples, client 102 may store Bates-numbered documents and their corresponding Bates numbers in local or network storage, and track or categorize the Bates numbers of such documents according to their Bates prefix. Thus, upon determining the appropriate Bates prefix to apply to an attachment in step 510, client 102 may automatically begin numbering where the last Bates-numbered document with the same prefix left off. For example, if the last page of Bates-numbered document with prefix "ABC" ended at ABC00005, then client 102 may automatically begin numbering, in step 510, an attachment for which the "ABC" prefix has been selected at ABC00006. In other examples, this numbering may not necessarily be automatic, but rather client 102 may provide options to a sender to begin numbering at, for example, ABC00006, which the sender may override if a different Bates number is desired.

In step 512, client 102 may apply the appropriate Bates-numbering to the attachment and store the attachment in virtual memory. Thus, the first page of the attachment may be numbered with the appropriate or selected prefix, as well as with the appropriate number automatically generated by client 102 or selected, e.g., by a sender, during step 510. Client 102 may then number the remaining pages of the attachment sequentially (or in any other order or format) from the first page (n, n+1, n+2, etc.) utilizing the same Bates prefix. In step 514, client 102 may determine whether any other attachments have been selected for Bates numbering (e.g., by a sender operating client 102), and steps 510-514 may repeat until no further attachments are selected for Bates numbering. Following one or more iterations of steps 510-514, client 102 may substitute out the original attachments on the email for the corresponding Bates-numbered versions of the attachments stored in virtual memory in step 516. In step 518, client 102 may provide information to send an email containing one or more Bates-numbered attachments, and save copies of the Bates-numbered attachments in local or network storage in step 520. Thereafter, client 102 may delete the attachments contained in virtual memory in step 522.

Variations on process 500 and the reordering of one or more steps may be apparent without departing from the spirit of the disclosed embodiments. For example, rather than engaging in an iterative process of selecting attachments one-at-a-time for Bates numbering in steps 510-514, step 508 may include client 102 providing options to a user to select all attachments for which Bates numbering is desired. Afterwards, client 102 (and/or a user operating client 102) may determine the appropriate Bates prefix(es) and starting number(s) for those attachments in step 510. This may occur by, for example, a sender selecting a prefix and/or starting number for each attachment individually within a window, table, or menu of interface 230. In other embodiments, a sender may select, within interface 230, two or more attachments collectively within a window, table, or menu, and select a prefix and/or starting number for the two or more attachments. In still other embodiments, sequential numbering of two or more attachments selected to have the same Bates prefix may be accomplished by client 102 applying the starting number to the first page to the first-ordered attachment, with the numbering proceeding in sequence throughout the rest of the first attachment and continuing into the second, third, etc. attachments. Thus, in certain embodiments, a sender may operate client 102 to adjust the numbering of one or more attachments by reordering the attachments, e.g., within the management interface 230.

Still other variations on process 500 may be apparent without departing from the spirit of the disclosed embodiments. For example, steps 514-522 may be reordered in one or more ways to achieve certain ends, such as by replacing attachments on the email and/or saving copies in local or network storage after Bates-numbering is applied to an attachment, but before another is selected for Bates numbering. As one of ordinary skill in the art would recognize, one or more rearrangements and reordering of the process 500 steps may be appropriate (or not) depending on the specific systems and situations in which embodiments consistent with the disclosed embodiments may be implemented.

Additional types of features for email attachment management, consistent with certain disclosed embodiments, may include additional, or different, operations and/or process steps. For example, FIG. 6 is a flowchart illustrating an exemplary process 600 for providing access rights or restrictions to attachments during email attachment management, which may occur as a subprocess of one or more processes 300 or 400, or may otherwise overlap with those processes. Process 600 may be performed by one or more components of system 100, including functionalities of various software or applications, such as application 202A, operated or supported by one or more components of system 100. The illustrations, descriptions, functionalities, and operations disclosed in connection with process 600 with respect to client 102 are also applicable to platform 110, and vice versa. Process 600 may begin by receiving a request to initiate attachment management in step 602. Such a request may be received in similar manners as with respect to processes 300, 400, and 500 by a client 102, email platform 110, or any other component of system 100, which may then perform one or more of the remaining steps of process 600 either alone or in combination with other components.

In step 604, client 102 may determine whether the email contains one or more attachments. If not, client 102 may perform processes to send or forward the email to one or more designated recipients (step 622). If client 102 determines that the email contains at least one attachment, it may provide attachment management functions in step 606. This may include, for example, displaying an interface or window to permit revisions and/or editing of attachments by a sender (e.g., within interface 230). In step 608, client 102 may determine whether one or more attachments have been selected for applying access rights. In certain disclosed embodiments, a sender operating client 102 may select an attachment for applying access rights by clicking on an attachment or check box within interface 230 or by, as other examples, selecting an option from a toolbar, menu, window, etc. within interface 230, or through any other means known in the art.

In step 610, client 102 may receive a designation of access rights for one or more selected attachments. In certain embodiments, the access rights for an attachment may be selected by a sender in interface 230. Access rights may include restrictions on the rights of a recipient of the email (e.g., a recipient operating client 104) to perform certain operations or processes on an attachment. Thus, access rights may include restrictive rights such read-only, edit-only, comment-only, etc. Access rights may further prohibit a recipient from saving an attachment in either or both of local or network storage. Thus, consistent with certain embodiments, access rights may grant a recipient only the option to open and view an attachment in an application within a virtual memory that is erased after the viewing is complete. In addition to permitting viewing, other access rights may permit editing and revising of attachments by a recipient operating client 104, which may then save or not save such attachments in the local or network storage, depending on the access rights granted to the recipient. In certain embodiments, access rights with respect to an attachment may be unique to one or more recipients, they may be applied to groups of recipients (e.g., recipients associated with a particular business or institution), or in other examples preexisting levels of access rights may be applied for one or more recipients or groups of recipients. Consistent with certain embodiments, a sender may apply access rights to an attachment within interface 230 by selecting a options in a check box, toolbar, menu, window, right-click, drop-down list, etc.

Client 102 may apply access rights to an attachment and store the attachment in virtual memory in step 612. In step 614, client 102 may determine whether or not another attachment has been selected for applying access rights. If so, steps 610-614 may repeat in an iterative fashion, but if not, process 600 may proceed to step 616 and client 102 may substitute the attachment(s) containing access rights stored in virtual memory for the original attachment(s) on the email. In step 618, client 102 may provide information to send the email, and delete the version(s) of the attachment(s) stored in the virtual memory in step 620.

As with the other processes described herein, one or more variations on process 600 and the reordering of one or more steps may be apparent without departing from the spirit of the disclosed embodiments. As certain examples, steps 614-620 may occur in a different order, such that attachments to the email are replaced before another is selected for applying access restrictions, or such that the virtual memory is emptied after replacing the attachments to the email but before either selecting another attachment for access rights or sending the email.

Figure 7:
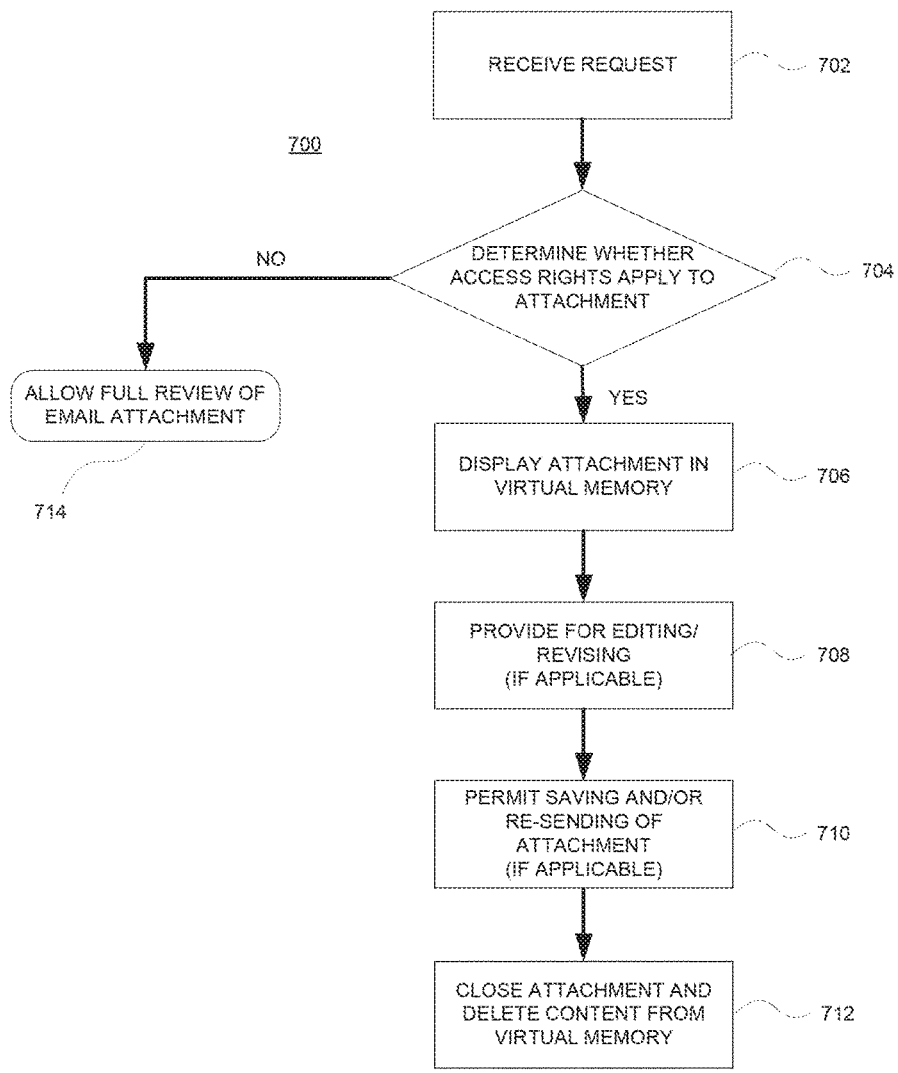
FIG. 7 is a flowchart illustrating an exemplary email attachment review process consistent with certain embodiments.

FIG. 7 is flowchart illustrating an exemplary process 700 for managing email attachments to which access rights have been applied. Process 700 may be performed by one or more components of system 100, such as client 104 (and/or a recipient operating client 104) or email platform 110, which may further include the functionalities of various software or applications, including but not limited to application 202A. The illustrations, descriptions, functionalities, and operations disclosed in connection with process 700 with respect to client 104 are also applicable to platform 110, and vice versa. Platform 110 may, in step 702, receive a request to initiate email attachment management. Consistent with certain embodiments, the request may be a recipient's operating client 104 to click on an attachment in an email message, or to select a toolbar option, hot-key sequence, or any other means of requesting to initiate attachment management. Such a request may be received by a client 104 or an email platform 110, or any other component of system 100, which may then perform one or more of the remaining steps of process 700 either alone or in combination with other components.

In step 704, email platform 100 may determine whether access rights were applied to an email attachment (e.g., by a sender operating client 102). If not, then a recipient may proceed to operate client 104 to open the attachment, save it, edit it, store it, etc. without restriction. If access rights were applied, however, in step 706 platform 110 may open the attachment in virtual memory and display it to the recipient. The virtual memory display may disable any copy, save, and print functions to prevent reviewers 104 from obtaining control over any part of the displayed content. The displaying may, for example, be in a browser or other software application or interface that may prevent the recipient from performing one or more operations on the attachment consistent with the access rights applied. In step 708, platform 110 may render or display the attachment such that a recipient may (e.g., with an interface 230) edit or revise the attachment, depending on the access rights applied to the attachment. If a recipient has access rights to edit or revise the attachment, the platform 110 may store edits and revisions in the virtual memory. In step 710, if the access rights permit, the client 104 may save or store the attachment in local or network storage. If access rights do not permit saving in local or network storage, step 710 may be skipped. In certain aspects, local or network saving may not be permitted, although a recipient operating interface 230 may, via platform 110, save the edits in virtual memory. In still further aspects, a recipient operating interface 230, via platform 110, may send a revised version of the attachment stored in virtual memory in an email to the sender or another authorized or designated recipient. In step 712, platform 110 may close the attachment and delete it from virtual memory.

FIG. 8 is a flowchart illustrating another exemplary process 800 for managing email attachments. Process 800 may be performed by one or more components of system 100, such as client 102 or email platform 110, which may further include the functionalities of various software or applications, including but not limited to application 202A. The illustrations, descriptions, functionalities, and operations disclosed in connection with process 800 with respect to platform 110 are also applicable to client 102, and vice versa. Platform 110 may, in step 802, intercept an email sent by, for example, a sender operating client 102. In one aspect, platform 110 receives the email after a sender operating client 102 has selected an option to send an email (such as a selecting a "send" button within interface 230 or selecting a hot-key option, toolbar option, etc.) but before the email reaches a recipient operating client 104. In other aspects, client 102 may receive the email after a sender operating client 102 has selected an option to send an email, but before the email reaches a recipient operating client 104.

In step 804, platform 110 and/or client 102 may determine whether the email contains any attachment(s). For example, platform 110 and/or client 102 may query the email and return a list of attachments (e.g., files) to the email. If platform 110 and/or client 102 detects no attachments, then platform 110 and/or client 102 may provide information to send or forward the email to its designated recipient operating client 104 (step 416).

In step 806, if one or more attachments are detected, platform 110 and/or client 102 may determine whether the attachment(s) comply with one or more default attachment policies. A default attachment policy may, for example, require that each attachment follow a file name convention, have metadata removed, contain certain redactions, have Bates-numbers incorporated, have converted to PDF format, have access rights applied, or follow any other formatting requirements, properties requirements, or sending requirements for attachments. Consistent with the disclosed embodiments, a user (e.g., a sender or receiver) operating client 102, 104 may create a default attachment policy, stored and/or implemented by one or more of client 102, client 104, platform 110, or application 202A. In still additional embodiments, a user (e.g., a sender or receiver) operating client 102 may create a default attachment policy associated with a particular entity or department within an entity, or may create a default attachment policy associated with one or more entities or departments within an entity. In other aspects, a user operating client 102 may create a default attachment policy that applies to all other clients residing on a particular network, such as a local area network, wide area network, portions of the Internet, etc, such that attachments sent by clients residing on the network must comply with the default attachment policy.

If all attachments comply with the default attachment policy, platform 110 and/or client 102 may provide information to send or forward the email to its designated recipient operating client 104 (step 816). If platform 110 and/or client 102 determine that one or more attachments do not comply with the default attachment policy, it may remove the attachment(s) from the email and store the attachment(s) in virtual memory (step 808). In one aspect, platform 110 and/or client 102 may remove only the attachments failing to comply with the default attachment policy, and leaving the compliant attachments attached to the email. In another aspect, platform 110 and/or client 102 may remove all attachments, regardless of whether each one complies with the default attachment policy. In still further aspects, platform 110 and/or client 102 may remove non-compliant attachments from the email, and provide an option (e.g., selection window or pane) to a sender operating client 102 to select one or more compliant attachments to additionally remove from the email and store in virtual memory. In yet additional aspects, platform 110 and/or client 102 may prompt the sender operating 102, e.g., by displaying a window, pane, or interface that identifies the attachment policy noncompliance. In still further aspects, platform 110 and/or client 102 may automatically convert an attachment to comply with the default attachment policy (e.g., rename, remove metadata, redact, insert Bates numbers, convert to PDF, apply access rights, etc.) and display information regarding the modified attachment in a window, pane, or interface, etc. for review by a sender.

In step 810, client 102 and/or platform 110 may be configured to perform one or more attachment management options. For example, client 102 and/or platform 110 may perform processes that generate for display a user interface (e.g., interface 230) including one or more attachments and/or links to attachments. The interface may also include one or more menus, options, selections, etc. to enable a user to revise, edit, configure, customize, and the like, the attachments, consistent with the disclosed embodiments. For instance, a sender may, through client 102 and/or platform 110, edit, revise, reformat, or otherwise configure attachments through one or more of the nonlimiting operations described herein, such as renaming attachments, cleaning metadata, redacting, Bates-numbering, converting to PDF, applying access rights applied, binding, cover-page insertion, etc.

In step 810, client 102 and/or platform 110 may be configured to substitute one or more of the revised attachments, and reattach them to the email. In certain embodiments, client 102 and/or platform 110 may substitute all attachments stored in virtual memory, whether or not edited or revised. In step 812, client 102 and/or platform 110 may perform processes to delete the stored attachments and content in virtual memory, such that the virtual memory no longer contains either the original or edited/revised attachments. Process 800 may return to step 806, and again evaluate whether the attachment(s) comply with one or more default attachment policies. If so, platform 110 and/or client 102 may provide information to send or forward the email to its designated recipient operating client 104 (step 816). If one or more attachments do not comply with a default attachment policy, however, process 800 may return to step 808 and proceed through steps 808-814. Rearrangements and reordering of one or more steps in process 800 may occur without departing from the spirit and scope of the disclosed embodiments.

Other aspects of the disclosed embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

What is claimed is:

1. A computer-based method for managing email attachments, comprising:
    receiving an email containing an original attachment;
    providing an interface for converting an original attachment of an email;
    changing an attribute and converting the original attachment to a modified attachment based on input received through the interface, wherein changing the attribute comprises:
    removing metadata from the original attachment,
    converting the original attachment from one file type to a different file type, and
    binding the original attachment to an additional attachment;
    removing the original attachment from the email,
    storing the original attachment in a virtual memory,
    storing the modified attachment in the virtual memory, and
    deleting one or more of the original attachment or the modified attachment from the virtual memory after the email with the modified attachment is sent to the recipient.

2. The computer-based method of claim 1, wherein the method further comprises converting the original attachment from one file type to a different file type based on a default attachment policy.

3. The computer-based method of claim 2, wherein the method further comprises removing metadata from the original attachment based on a default attachment policy.

4. The computer-based system of claim 1, wherein the method further comprises opening, within the interface, the original attachment or the modified attachment for editing.

5. A computer-based system for managing email attachments, comprising:
a memory storing software instructions; and
one or more processors configured to execute the software instructions to perform operations including:
providing an interface for converting an original attachment of an email,
changing an attribute and converting the original attachment to a modified attachment based on input received through the interface,
wherein changing the attribute comprises:
designating access rights to the original attachment,
removing the original attachment from the email,
storing the original attachment in a virtual memory,
storing the modified attachment in the virtual memory, and
deleting one or more of the original attachment or the modified attachment from the virtual memory after the email with the modified attachment is sent to the recipient.

6. The computer-based system of claim 5, wherein the designated access rights limit the recipient to opening the modified attachment within the virtual memory that is erased after review of the modified attachment is complete.

7. The computer-based system of claim 6, wherein opening the modified attachment within the virtual memory limits the recipient from saving or printing the modified attachment.

8. The computer-based system of claim 5, wherein the designated access rights limit the recipient to read-only access to the modified attachment.

9. The computer-based system of claim 5, wherein the designated access rights permit the recipient to edit the modified attachment.

10. The computer-based system of claim 5, wherein the one or more processors are further configured to provide information to send the email with the modified attachment to both the recipient and a second recipient, and wherein the designated access rights comprise a first access right for the recipient and a different access right for the second recipient.

11. The computer-based system of claim 5, wherein changing the attribute further comprises binding the original attachment to an additional attachment.

12. The computer-based system of claim 5, wherein changing the attribute further comprises incorporating the original attachment into a compressed archive file.

13. The computer-based system of claim 5, wherein changing the attribute further comprises incorporating the original attachment and an additional attachment into a compressed archive file.

14. The computer-based system of claim 5, wherein the one or more processors are further configured to open, within the interface, the original attachment or the modified attachment for editing.

15. A computer-based system for managing email attachments, comprising:
a memory storing software instructions; and
one or more processors configured to execute the software instructions to perform operations including:
providing an interface for converting an original attachment of an email,
changing an attribute and converting the original attachment to a modified attachment based on input received through the interface,
wherein changing the attribute comprises:
binding the original attachment to an additional attachment, removing the original attachment from the email,
storing the original attachment in a virtual memory,
storing the modified attachment in the virtual memory, and
deleting one or more of the original attachment or the modified attachment from the virtual memory after the email with the modified attachment is sent to the recipient.

16. The computer-based system of claim 15, wherein changing the attribute further comprises converting the original attachment from one file type to a different file type.

17. The computer-based system of claim 15, wherein changing the attribute further comprises incorporating the bound original attachment into a compressed archive file.

18. The computer-based system of claim 15, wherein the one or more processors are further configured to open, within the interface, the original attachment or the modified attachment for editing.

19. A computer-based system for managing email attachments, comprising:
a memory storing software instructions; and
one or more processors configured to execute the software instructions to perform operations including:
providing an interface for converting an original attachment of an email,
changing an attribute and converting the original attachment to a modified attachment based on input received through the interface,
wherein changing the attribute comprises:
incorporating the original attachment into a compressed archive file,
removing the original attachment from the email,
storing the original attachment in a virtual memory,
storing the modified attachment in the virtual memory, and
deleting one or more of the original attachment or the modified attachment from the virtual memory after the email with the modified attachment is sent to the recipient.

* * * * *